United States Patent
Metcalf et al.

(10) Patent No.: US 11,244,022 B2
(45) Date of Patent: Feb. 8, 2022

(54) SYSTEM AND METHODS FOR USER CURATED MEDIA

(71) Applicant: Oath Inc., New York, NY (US)

(72) Inventors: Michael Metcalf, San Francisco, CA (US); Roger William Graves, San Francisco, CA (US); Alexandre Linares, Foster City, CA (US); Pedro Valente, San Francisco, CA (US)

(73) Assignee: VERIZON MEDIA INC., New York, NY (US)

( * ) Notice: Subject to any disclaimer, the term of this patent is extended or adjusted under 35 U.S.C. 154(b) by 961 days.

(21) Appl. No.: 14/012,961

(22) Filed: Aug. 28, 2013

(65) Prior Publication Data

US 2015/0067505 A1  Mar. 5, 2015

(51) Int. Cl.
*G06F 16/958* (2019.01)

(52) U.S. Cl.
CPC .................................. *G06F 16/958* (2019.01)

(58) Field of Classification Search
CPC ................ G06Q 30/0282; G06Q 50/01; G06F 17/30864; G06F 17/3089; G06F 16/958
USPC .................................. 707/709; 705/319, 347
See application file for complete search history.

(56) References Cited

U.S. PATENT DOCUMENTS

| | | | | |
|---|---|---|---|---|
| 6,557,027 | B1 * | 4/2003 | Cragun | H04L 12/1813 709/204 |
| 8,725,858 | B1 * | 5/2014 | Wu | G06Q 30/0254 709/223 |
| 9,129,227 | B1 * | 9/2015 | Yee | G06N 20/00 |
| 9,195,753 | B1 * | 11/2015 | King | G06F 16/9535 |
| 2003/0195884 | A1 * | 10/2003 | Boyd | G06F 16/9535 |
| 2004/0172405 | A1 * | 9/2004 | Farran | G06F 16/958 |
| 2006/0184558 | A1 * | 8/2006 | Martin | H04N 21/4825 |
| 2006/0282856 | A1 * | 12/2006 | Errico | G06Q 30/02 725/46 |
| 2008/0082565 | A1 * | 4/2008 | Chang | G06Q 30/02 |
| 2008/0243733 | A1 * | 10/2008 | Black | G06F 16/7867 706/16 |
| 2009/0150806 | A1 * | 6/2009 | Evje | G06F 16/9535 715/762 |
| 2009/0282013 | A1 * | 11/2009 | Joshi | G06F 16/951 |
| 2010/0082775 | A1 * | 4/2010 | Banga | G06F 16/9535 709/219 |
| 2010/0228777 | A1 * | 9/2010 | Imig | G06F 16/335 707/772 |
| 2011/0137726 | A1 * | 6/2011 | Amatriain | G06Q 30/0254 705/14.52 |

(Continued)

*Primary Examiner* — Ashish Thomas
*Assistant Examiner* — Nargis Sultana
(74) *Attorney, Agent, or Firm* — Cooper Legal Group, LLC

(57) ABSTRACT

Methods and systems for recommending online media content to other users includes receiving a selection of media content rendered on content page. The media content is identified by a user for sharing. A list of topics associated with the user is generated for presenting on a user interface. The topics are descriptive of the media content selected for sharing. Selection of one or more topics for the selected media content is received from the user. The received selections define the user's relevancy perspective for the selected media content. A recommendation for the selected media content is provided in content streams of users that follow the selected topics for users interactions with the selected media content.

19 Claims, 20 Drawing Sheets

(56) References Cited

U.S. PATENT DOCUMENTS

| | | | |
|---|---|---|---|
| 2011/0145719 A1* | 6/2011 | Chen | G06Q 10/10 715/739 |
| 2011/0179389 A1* | 7/2011 | Douen | G16H 40/67 715/843 |
| 2012/0089621 A1* | 4/2012 | Liu | G06F 16/335 707/749 |
| 2012/0158476 A1* | 6/2012 | Neystadt | G06Q 50/01 705/14.16 |
| 2012/0167010 A1* | 6/2012 | Campbell | G06F 16/9535 715/825 |
| 2012/0191776 A1* | 7/2012 | Ruffner | G06F 16/954 709/204 |
| 2012/0216122 A1* | 8/2012 | Wong | G06F 16/954 715/738 |
| 2012/0317123 A1* | 12/2012 | Green | G06F 16/437 707/748 |
| 2013/0013406 A1* | 1/2013 | Lifson | G06Q 30/0641 705/14.53 |
| 2013/0013592 A1* | 1/2013 | Narvekar | G06N 5/04 707/723 |
| 2013/0036344 A1* | 2/2013 | Ahmed | G06F 16/9535 715/205 |
| 2013/0086170 A1* | 4/2013 | Skelton | G06Q 30/00 709/204 |
| 2013/0185106 A1* | 7/2013 | Donatone | G06Q 10/06 705/7.14 |
| 2013/0204825 A1* | 8/2013 | Su | G06N 20/00 706/46 |
| 2013/0212178 A1* | 8/2013 | Krishnamurthy | G06Q 30/0269 709/204 |
| 2013/0218871 A1* | 8/2013 | McConnell | G06F 16/248 707/722 |
| 2013/0218905 A1* | 8/2013 | Sankarasubramaniam | H04N 21/4661 707/748 |
| 2013/0297589 A1* | 11/2013 | Work | G06Q 10/1053 707/722 |
| 2013/0304818 A1* | 11/2013 | Brumleve | G06Q 30/02 709/204 |
| 2013/0325779 A1* | 12/2013 | Shahshahani | G06N 5/00 706/46 |
| 2013/0332469 A1* | 12/2013 | Nakamura | G06F 16/954 707/748 |
| 2014/0040370 A1* | 2/2014 | Buhr | H04L 67/306 709/204 |
| 2014/0101086 A1* | 4/2014 | Lu | G06N 5/04 706/46 |
| 2014/0101197 A1* | 4/2014 | Charytoniuk | G06F 16/9535 707/770 |
| 2014/0108372 A1* | 4/2014 | Oh | G06F 16/958 707/706 |
| 2014/0108408 A1* | 4/2014 | Edgar | G06F 16/9535 707/738 |
| 2014/0143247 A1* | 5/2014 | Rathnavelu | G06K 9/00288 707/737 |
| 2014/0164365 A1* | 6/2014 | Graham | G06Q 50/01 707/723 |
| 2014/0337161 A1* | 11/2014 | Whisnant | G06Q 50/01 705/26.7 |
| 2015/0058264 A1* | 2/2015 | Hughes | G06N 20/00 706/12 |
| 2015/0067505 A1* | 3/2015 | Metcalf | G06F 17/3089 715/716 |

* cited by examiner

SYSTEM AND METHODS FOR USER CURATED MEDIA

BACKGROUND

1. Field of the Invention

The invention relates generally to sharing online media content and, more particularly, to providing a recommendation of an online media content.

2. Description of the Related Art

Online media content has grown tremendously over the years in quantity and quality. Users are able to access and share online media content with other users using interactive tools. Some exemplary tools enable a user to select the online media content and share the media content with other users through links. Other ways of sharing the online media content is through social media. Social media provides a highly interactive platform through which users and entities share, create, comment, discuss and modify user generated online media content. Social media tools enable users to control quality, reach, frequency of exchange of the online media content.

When users share the media content with other users, the media content is associated with a particular topic identified by a content provider or by a media extraction engine executing on a server of a website on which the media content is provided. A typical media extraction engine uses an algorithm to associate a topic for the media content based on some keywords contained within the content. Such topic association by the content provider or the media extraction engine will not cover all aspects of the content, as the content may be directly or indirectly related to other topics not identified by the content provider or the algorithm. For example, a National Football League (NFL) team's quarterback's progress may be associated by the content provider or the algorithm with a NFL team, quarterback keyword, etc. However, neither the content provider nor the algorithm may associate the quarterback's progress with the high school the quarterback attended, a hobby, home country or other such topics that are related through direct or indirect association. Similarly, a picture taken of a college campus may be associated with the college, the location of the campus, architect details and other such topics but may not be associated with a pond or a garden or a waterfall within the campus. As a result, when users share the content with other users, the user is able to share the content with users that follow the generic and obvious topics that the algorithm or content provider identified. The user does not have the ability to share the content with other users who may be interested in the other topics that the user is able to identify and associate with the content, such as the high school of the quarterback in the quarterback example and the pond/waterfall from the picture example.

It is in this context that the embodiments of the invention arise.

SUMMARY

Embodiments of the disclosure provide methods and system for recommending online media content. The user selection of media content is detected and a list of topics is presented for the selected media content. The topics in the list may be associated with the user or be based on the selected media content. A selection of the topic is received from a user. The user's selection automatically triggers providing the selected media content to other users that follow the selected topic. It should be appreciated that the present embodiments can be implemented in numerous ways, such as a process, an apparatus, a system, a device, or a method on a computer readable medium. Several embodiments are described below.

In one embodiment, the present invention provides a method for recommending online media content to other users. The method includes receiving a selection of media content identified for sharing by a user. The media content is selected from a content page on which the media content is rendered. A list of topics associated with the user for the selected media content is generated for presenting on a user interface. The topics are descriptive of the media content selected for sharing. Selection of one or more topics for the selected media content is received from the user. The received selections define a perspective of the user for the selected media content. A recommendation for the selected media content is provided in content stream of users that follow the selected topics for users interaction with the selected media content.

In another embodiment, a method is provided. The method includes receiving a recommendation signal from a media page. The recommendation signal is associated with a user viewing the media page. A list of topics is generated, wherein the topics in the list are related to content of the media page and a history of topics followed by the user. Selection of one or more topics from the list of topics is detected. Recommendation data is generated for the media page. The generated recommendation data is provided to users that are following the selected one or more topics.

In another embodiment, a non-transitory computer-readable medium is provided. The computer-readable medium is equipped with programming instructions, which when executed by a computer system directs the computer system to provide the ability to recommend online media content rendered on a content page. The computer-readable medium includes programming instructions to receive a selection of media content recommended for sharing from a user, wherein the media content is selected from a content page; programming instructions to generate a list of topics for the selected media content for presenting on a user interface, wherein the topics are associated with the user and are descriptive of the media content selected for sharing; programming instructions to receive selection of one or more topics for the selected media content from the user, wherein the selection defines a relevancy perspective of the user for the selected media content; and program instructions for providing a recommendation for the selected media content in content streams of users that follow the selected topics of interest for user interactions with the selected media content.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings.

FIGS. 2b-2f illustrate exemplary screen renditions identifying various options, features or sub-tools available when the recommend tool is selected for sharing a media content rendered on a content page, in accordance with embodiments of the present invention.

FIG. 3f illustrates a screen rendition of a user interface displaying an exemplary recommendation metric used to determine the reputation of a user, in accordance with an embodiment of the present invention.

DETAILED DESCRIPTION

Figure 1A:
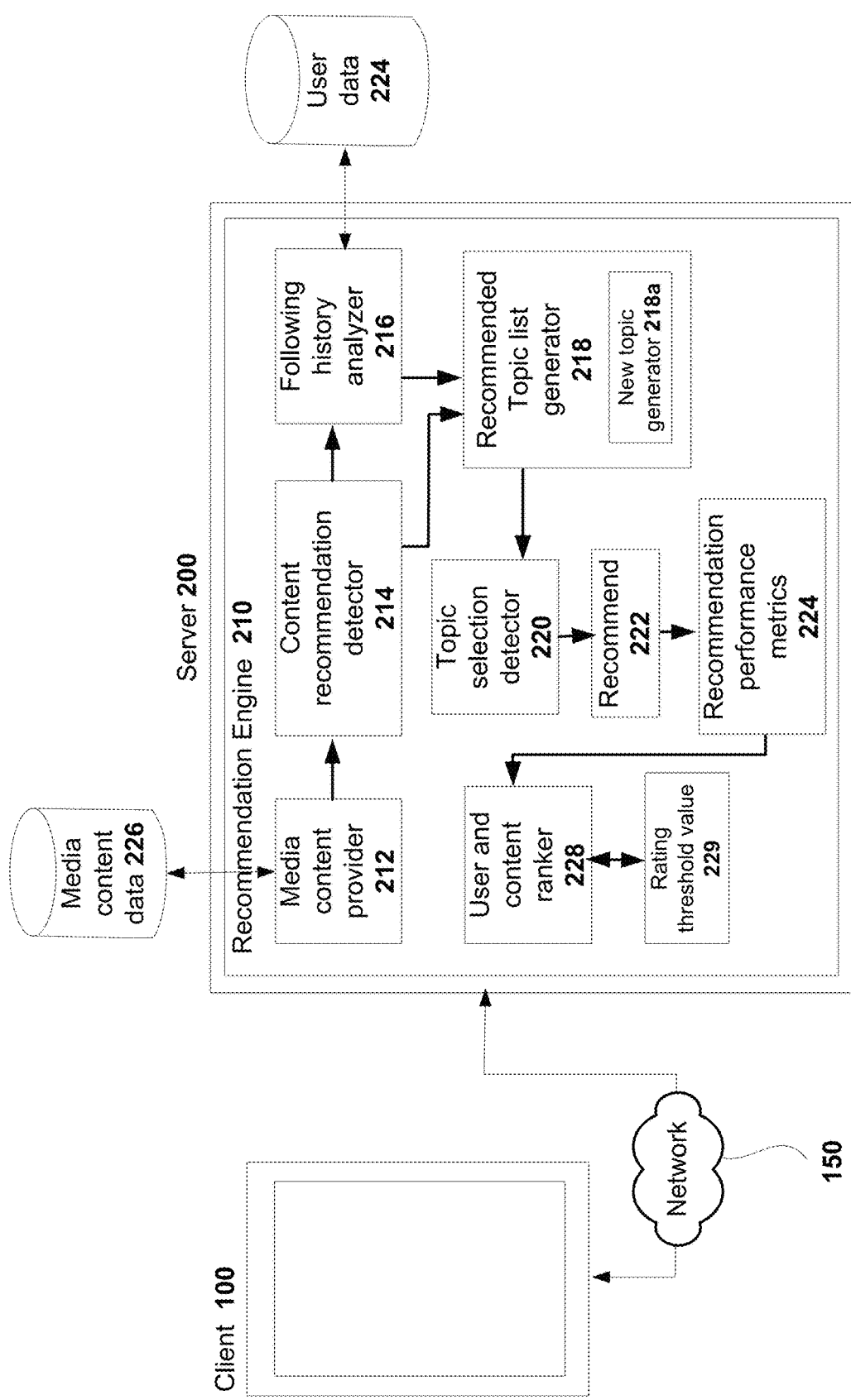
FIG. 1a illustrates a simple block diagram of various modules within a recommendation engine module for providing recommendation of an online media content rendered on a content page, in accordance with an embodiment of the present invention.

Embodiments of the present invention provide system, computer readable media having program instructions, and methods for recommending online media content to other users. More particularly, according to various embodiments of present invention, the sharing of content is based on the relevance of content to a user. A recommendation engine is used for providing recommended content to other users. The recommendation engine is configured to receive selection of media content that the recommending user has identified for sharing, present a list of topics for associating with the media content, receive selection of one or more topics from the list and provide the selected media content to users following the one or more selected topic forums based on the recommending user's topic selection for the media content. The topics presented by the recommendation engine for user selection include topics identified by an extraction engine based on context of the media content and topics identified based on the recommending user's following history at the various media content rendered on the content page over time. The recommendation engine keeps track of the recommending user's following history. The recommending user interacts with the list of topics and selects one or more topics from the presented list. In response to detection of selection of the one or more topics, the recommendation engine tags the selected media content with the chosen topic(s). The media content is provided at the appropriate topic forums so that other users who are following the selected topics are able to interact with the media content recommended by the recommending user. The selection of topic by the recommending user defines the recommending user's perception of relevancy for the selected media content.

Other users' interactions at the selected media content are tracked in the respective topic forums, and sharing metrics are computed for the recommending user. The sharing metrics define the type and level of sharing and/or interactions registered for the recommended media content. The recommending user's sharing metrics reflect the level of confidence placed by the other users on the recommending user based on the content recommended. The computed sharing metrics may be used to determine the expertise level of the recommending user. The recommending user's expertise level and the sharing metrics may be used to organize the media content recommended by the recommending user within the selected topic forum based on the popularity of the recommending user.

The various embodiments describe a method for sharing media content based on what the content means to a user providing the recommendation, which might be different from what a context extraction engine identifies. Typical social grid applications are configured to identify a user, collect articles or digital content for the user and publish the collected articles or digital content for the user. The current embodiments, on the other hand, publish or push out online media content based on the content's meaning or relevance to a recommending user. An extraction engine may have determined a topic for the media content selected for sharing by the recommending user based on the content contained within and may have initially published the media content under the topic's forum. The recommending user may review the media content in the topic forum and may wish to share the content with users of a different topic forum. The recommending user's selection of topic is used for categorizing and for presenting the selected media content under the different topic forum(s). In one embodiment, the topic specified by the recommending user will be used in addition to the one or more topics the extraction engine associates with the media content and the media content is published or pushed to users that are interested or follow both the topic forums.

Other users' interactions related to the online media content are monitored in the published topic forum and the type and level of interactions of the other users are used to compute the recommending user's metrics, ranking of the recommending user and the online media content. In one embodiment, the interactions of other users are used to generate an interest graph for the selected media content and data from the interest graph are used in computing the recommending user's metrics and ranking of the recommending user. The interactions can be determined by tracking the number of people that select the shared media content for viewing, the number of people's comments for the shared media content, and/or the number of people that recommend the shared media content to other users. The interest graph captures such interaction information. The computed metrics are used to determine the popularity of the recommending user and the popularity of the shared content.

FIG. 1 illustrates an exemplary system that is used for selecting an online media content and associating one or more topics identified by a recommending user to the selected media content and share the online media content with users that follow the topic forums for the selected topics. The system includes a client device 100 with a display device having a user interface that is configured to enable a user to access a content page, select media content for sharing, and select one or more topics to categorize the selected media content. The system also includes a server 200 executing an algorithm, such as a recommendation engine algorithm 210. The recommendation engine includes a plurality of modules that are configured to obtain user's request and selection over a network 150, such as the Internet. The selection is used to associate a topic for a media content selected from a content page and providing the online media content under a user-specified topic forum. The recommendation engine provides a user with tools to specify a topic for the media content, which may be different from the topic that an extraction engine at the server associated with the media content.

The plurality of modules within the recommendation engine 210 perform different functions related to associating a user-selected topic for an online media content so that the online media content may be provided in the appropriate topic forums for other users to interact. In one embodiment, some of the modules provided within the recommendation engine 210 include a media content provider module 212, a content recommendation detector module 214, following history analyzer module 216, a recommended topic list generator module 218, a topic selection detector module 220, a recommend module 222, recommendation performance metrics module 224 and a user and content ranker module 228. The aforementioned modules are exemplary and should not be considered restrictive or exhaustive. Fewer or additional modules may be provided within the recommendation engine 210 to enable a recommending user to identify a media content and to associate a topic for publishing the media content.

The media content provider module 212 is configured to identify a request for a media content page (otherwise termed "media page" or "content page") from a recommending user. In response to the request, the media content provider seeks input from an extraction engine to identify media content for the content page, extract the topic categories for the media content defined by the extraction engine, categorize the media content based on the topic categories defined by the extraction engine, format and return the categorized media content in a content page for rendering, in response to the request from the recommending user. The extraction engine interacts with media content data store 226 to identify the media content for the content page. The media content may be any form of digital content that can be rendered on a content page, including audio content, video content, textual content, images, pictures, etc. Information related to the media content provided in the content page is made available to the content recommendation detector 214. Each media content provided in the content page is associated with an interactive selection tool.

Figure 1B:
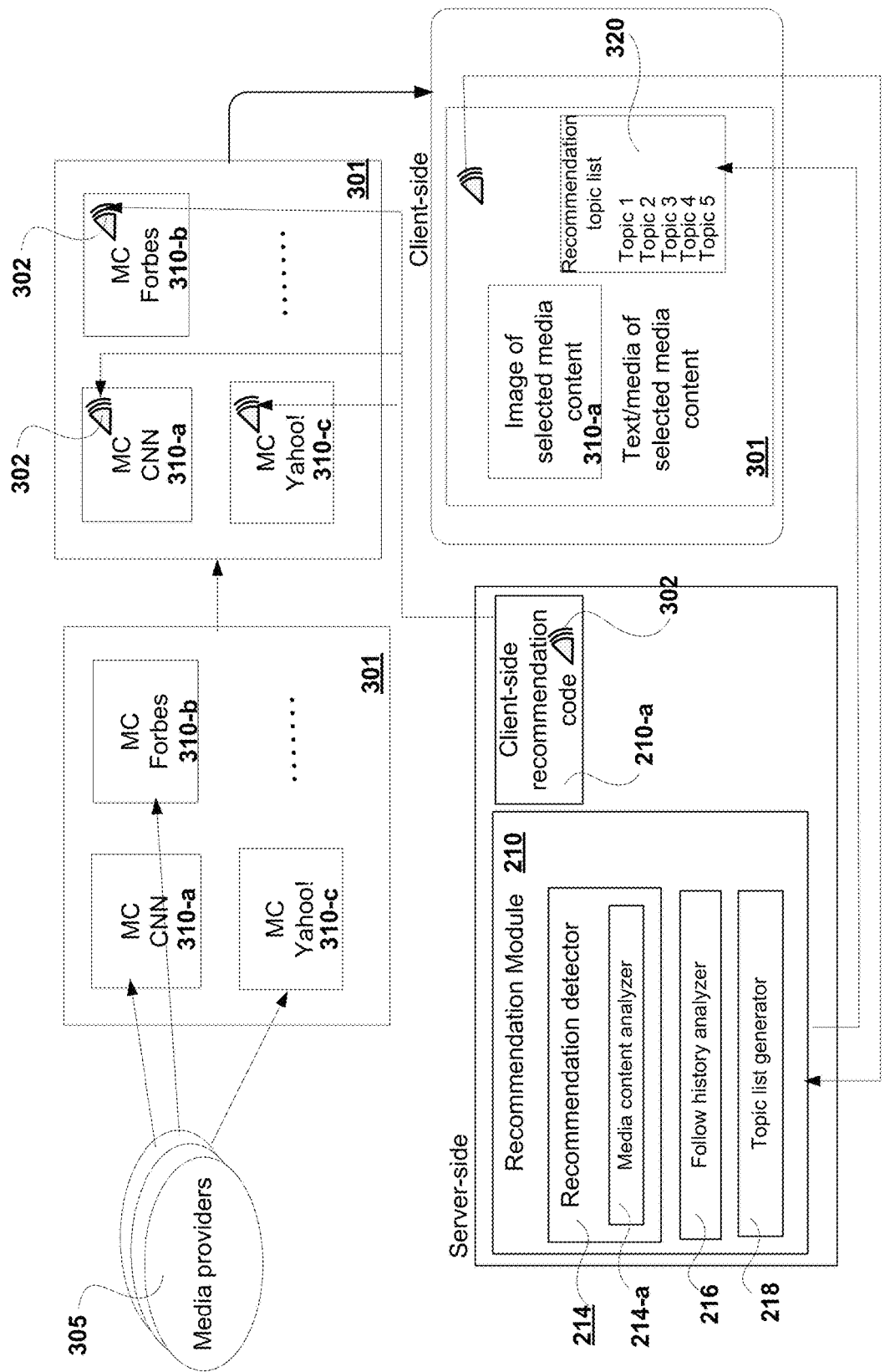
FIG. 1b depicts a simplified recommendation process flow followed by the recommendation engine module, in one embodiment of the invention.

FIG. 1b illustrates one embodiment wherein media content from different media providers are associated with the interactive selection tool. A media page 301 generated for a user may include media content 310-a, 310-b, 310-c, etc., obtained from a plurality of media providers. Each media provider, search engine entity, third party publishers, content aggregators, etc., or any other entity that can generate or provide media content may be presented with an option to include the interactive selection tool for the media content generated by the media provider. When the option is selected by the media provider, for example, the recommendation module 210 is initiated. Upon initiation, the recommendation module 210 provides recommendation signal tool for each of the media content generated by the media provider. The recommendation signal tool includes client-side recommendation code 210-a, which when initiated will interact with server-side code of the recommendation module 210. As illustrated in FIG. 1b, in response to triggering of the recommendation module 210 by the content providers, for example, each media content 310-a, 310-b, 310-c, etc., generated by media providers 305 includes the interactive selection tool, such as recommendation signal 302 with the embedded client-side recommendation code. A user may select a media content from the media page for recommending to other users using the recommendation signal tool 302. The client-side code of the recommendation signal tool 302, which when triggered by user selection action for a select media content on the media page, generates recommendation signal. The recommendation signal is transmitted to the server-side recommendation module, which interprets the signal and provides the list of topics for the selected media content.

Figure 2A:
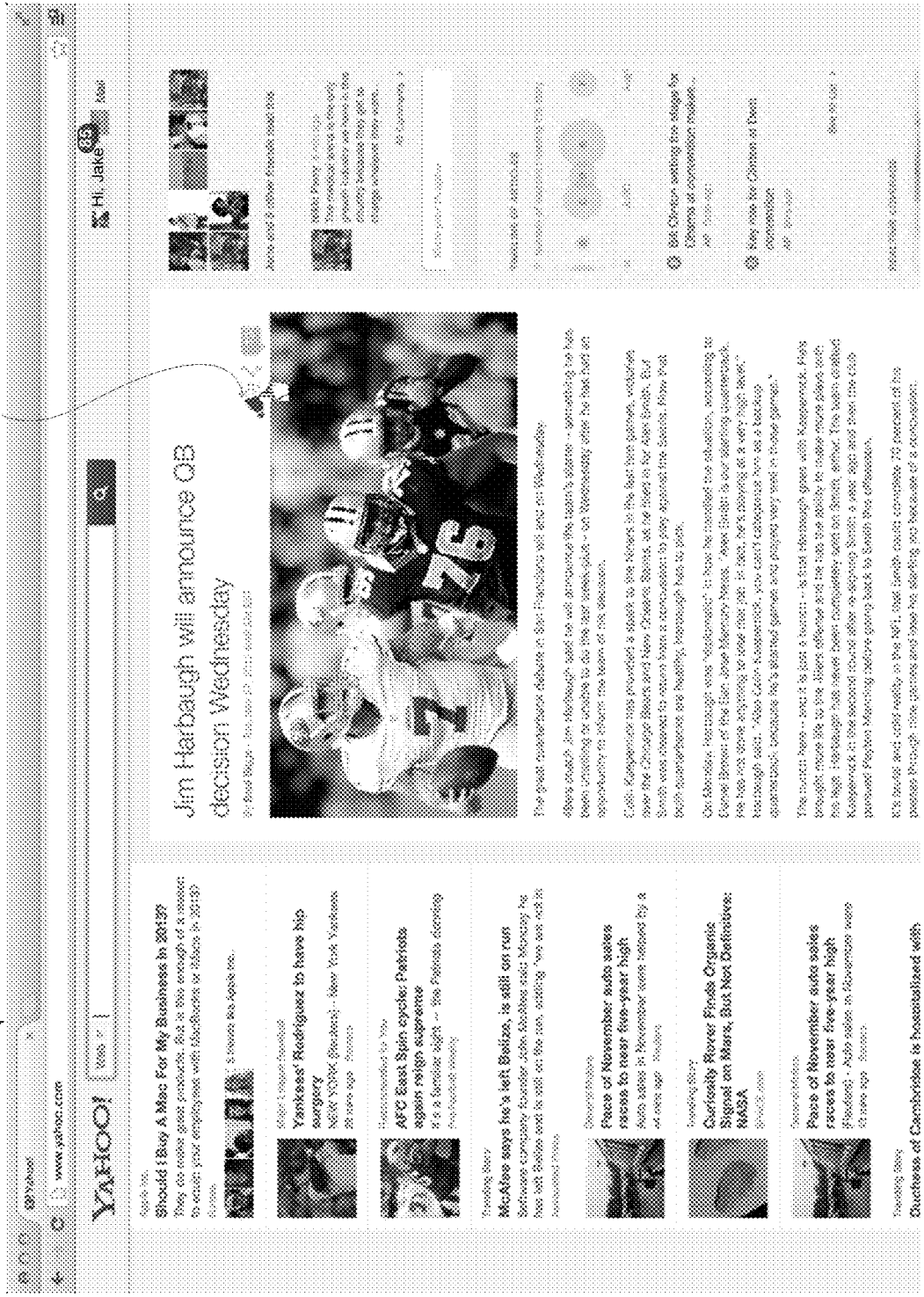
FIG. 2a illustrates an exemplary screen rendition of a recommend tool provided for sharing a media content rendered on a content page, in accordance with an embodiment of the invention.

FIG. 2a illustrates a sample view of a content page with an interactive selection tool, such as a "Recommendation tool" 302, that is used for generating a recommendation signal, in one embodiment. As mentioned earlier, the recommendation tool may be provided for every media content provided on the content page. The recommendation tool 302 illustrated in FIG. 2a is exemplary and should not be considered restrictive. Other forms of interactive selection tool may be provided on the content page for a recommending user to interact with to generate the recommendation signal that is indicative of selection of the media content for sharing. Further, the selection may be through an active or a passive interaction at the recommendation tool.

Referring back to FIG. 1b, a recommendation detector 214 within the recommendation module 210 on the server detects and interprets the recommendation signal originating from the recommendation signal tool of the media page to determine the media content from which the recommendation signal originated and the identity of the recommending user. The recommendation detector 214 interacts with the different sub-modules within the recommendation module 210 to generate a list of topics 320 for the selected media content. The recommendation detector may analyze the selected media content using a media content analyzer sub-module 214-a and a history analyzer sub-module 216. Information from the content analyzer sub-module 214-a and the history analyzer 216 is used to generate the list of topics for the selected media content. The generated list of topics 320 for the selected media content is returned by the recommendation module 210 for presenting at the selected media content on the media page rendered on a client device.

The selected media content may be associated with a topic. In one embodiment, the media content analyzer 214-a may use the extraction engine to identify one or more topics associated with the selected media content. The extraction engine identifies the topics using a keyword extraction algorithm. Additional information related to the selected media content may be identified by the media content analyzer 214-a based on the analysis of the content. The information related to the selected media content is provided to the following history analyzer module (or simply the "analyzer module") 216.

The analyzer module 216 is configured to obtain the identity of the recommending user from the information shared by the content recommendation detector module 214, interact with a user data store 224 to identify interaction information of the recommending user. The user's interactions over time at the different media content are tracked and stored in the user data store 224. The user data store 224 is a repository that stores user related data of all users including user interactions, user metrics, user attributes, etc. The history analyzer module 216 analyzes the interactions of the recommending user to identify the interests of the recommending user, on the current and other content pages. Information from the history analyzer module 216 is provided to the recommended topic list generator module 218.

In one embodiment, the recommended topic list generator module 218 uses the interaction information for the recommending user provided by the history analyzer module 216 to identify topics for the media content selected for sharing by the recommending user. In another embodiment, the topic list generator module 218, in addition to using the information provided by the history analyzer module 216 also uses information obtained from an extraction engine to identify topics for the selected media content. As mentioned earlier, in one embodiment, the extraction engine may analyze the content within the selected media content and identify topics using a keyword extraction algorithm. The keyword extraction algorithm inspects the selected media content, identifies certain keywords present within the media content and identifies the topics associated with the keywords for the media content.

The topic list generator module 218 uses the topics obtained by analyzing the recommending user's explicit or implicit interaction information and/or the topics identified by the extraction engine to generate the list of topics for associating with the selected media content. In addition to the list of topics, the topic list generator module 218 may also identify and include information topics, tags, memes, or sentiments either presented to the user or specified by the user, questions, photo sharing application tags, places, locations and/or nearby users to include in the generated list of topics. The topic list generator module 218 then returns the generated list of topics in a user interface for presentation at the client device 100. User selection of topics at the user interface is used to associate the selected ones of the topics to the selected media content.

Figure 2B:
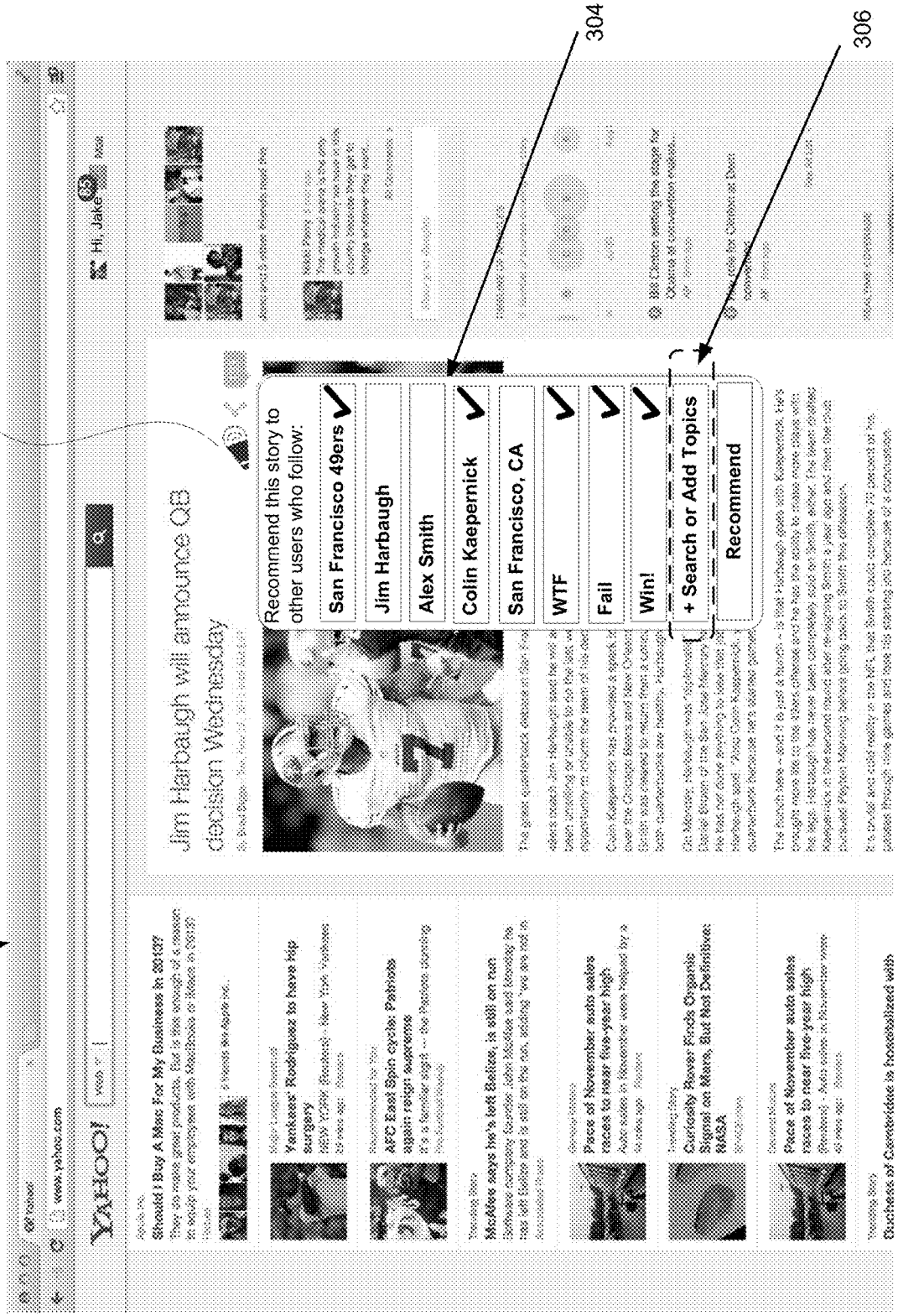

In addition to generating and rendering the list of topics, the topic list generator module 218 may also provide options to search for a different topic or add a new topic to associate with the selected media content. The new topic is used to offer a different perspective of the media content that cannot be identified by the topics provided by the extraction engine or be evident from analyzing the recommending user's interaction information. FIG. 2*b* illustrates a screen rendition of an instance of the content page with the topic user interface 304 rendering the list of topics to select for sharing a selected media content, wherein each topic identifies a corresponding topic forum. In addition to the list of topics, the topic user interface 304 also includes an option 306 to search for a different topic or add a new topic. The different topic or new topic provides a different perception of the recommending user for the selected media content.

For example, a recommending user may be following topic forums related to National Football League (NFL) games and come across an article related to San Francisco 49ers (a NFL sports team). The topic list generator module 218 using the input from a context extraction engine may identify variant of topics based on the keywords found within the content, such as San Francisco 49ers, Jim Harbaugh (the SF 49ers coach), Alex Smith, Colin Kaepernick, San Francisco, Calif., etc., as illustrated in the topic user interface 304 of FIG. 2*b*. Additionally, the topic list generator module 218 may analyze the user interactions of the recommending user in the user data store to identify other topics, such as photo sharing tags, questions, or topics related to unstructured entities, such as emotions/memes, Fail, Win, etc., of the recommending user associated with the media content that the extraction engine may not be able to identify. In addition to the list of topics, one or more options 306 to search for different topics and/or add new topics are also provided. In one embodiment, the option to add new topics or search for different topics may be critical since there is context in all content that extraction engine or recommending user interaction may miss. From the above NFL article example, Colin Kaepernick, a quarterback on the 49ers football team, may have attended Des Moines Lincoln High School where his NFL career is closely followed by the alumni of the High School. However, Des Moines Lincoln High School may not have been mentioned anywhere in the selected media content and there may have been no reference to this topic within the recommending user's interaction. By providing the option to the recommending user to add or search for Des Moines Lincoln High School topic and associate this new topic with the selected media content, the recommendation engine may be able to publish the selected media content to the users (i.e., alumni) who follow the Des Moines Lincoln High School topic.

A new topic generator module 218*a* within the topic list generator 218 provides the add/search topic option within the topic user interface 304 returned to the client device. When the recommending user selects the "add a topic" option, the new topic generator module 218*a* receives the new topic information provided by the recommending user and updates the list of topics available to the topic list generator 218 so that the new topic can be included with the list of topics provided during the recommending user's subsequent selection of media content. When the recommending user selects the search topic option, the new topic generator module 218*a* provides a user interface to allow the recommending user to provide search keywords. The new topic generator module 218*a* may be able to identify an existing topic by matching the search keywords, associate the identified topic with the selected media content and update the topic to the list of topics available to the topic list generator 218.

Figure 2C:
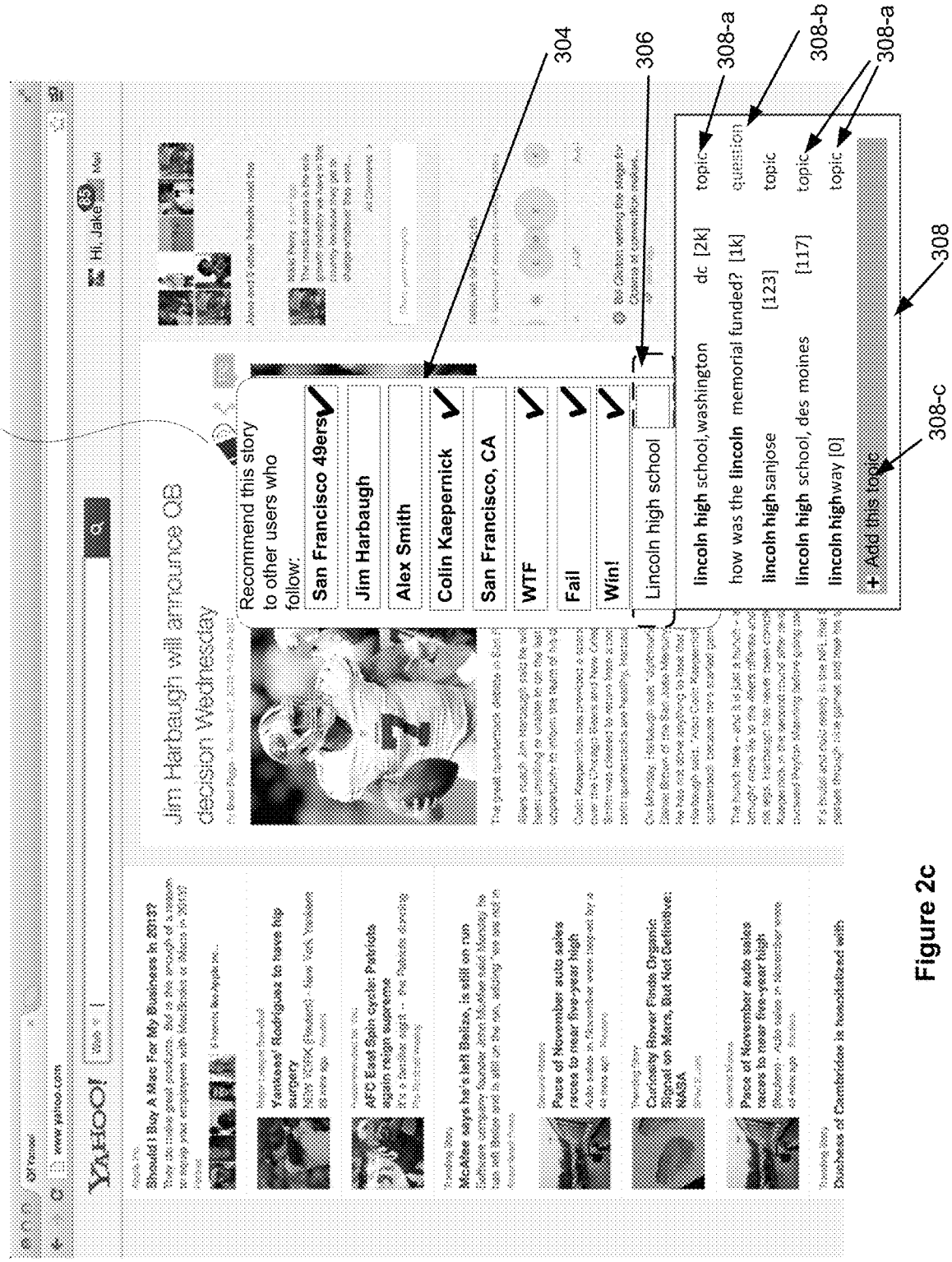

The topic list generator module also provides additional tools/options in the user interface for the addition or search option to enable the recommending user to avail these tools/options when adding new topic or searching for different topic to associate with the selected media content. In one embodiment, an auto complete feature 308 may be provided to assist the recommending user to quickly identify the topic. FIG. 2*c* illustrates an exemplary screen rendition of a user interface showing the auto complete feature 308 identifying one or more related topics 308-*a* or one or more related questions 308-*b* when the recommending user begins typing the text, "Lincoln High," using the add topic option 308-c. The auto complete feature may also be provided when the search topic option is selected. When the topics returned by the auto complete feature 308 do not include the topic that the recommending user is trying to associate with the selected media content, an option, "Add this topic," 308-c is provided to enable the recommending user to add a new topic using the text provided by the recommending user. Selecting the add topic option 308-c will result in the association of the selected media content to the new topic and updating this interaction to the user-related data within the user data store 224 for future mining. The list of topics generated by the topic list generator module 218 is also updated to include the newly added topic.

When the recommending user selects a topic from the list of topics provided in the topic user interface 304, the topic selection detector module 220 detects the selection and associates the selected topic with the selected media content so that the selected media content can be published or pushed to users that follow the selected topic forum. Similarly, when the recommending user adds a new topic or searches for a different topic, the topic selection detector module 220 detects the addition/identification of a new/different topic and associates the new/different topic with the selected media content. The selected media content may be tagged with the new or the selected topic so that the recommendation engine can identify and publish the selected media content to users that follow the selected topic forums.

Figure 1C:
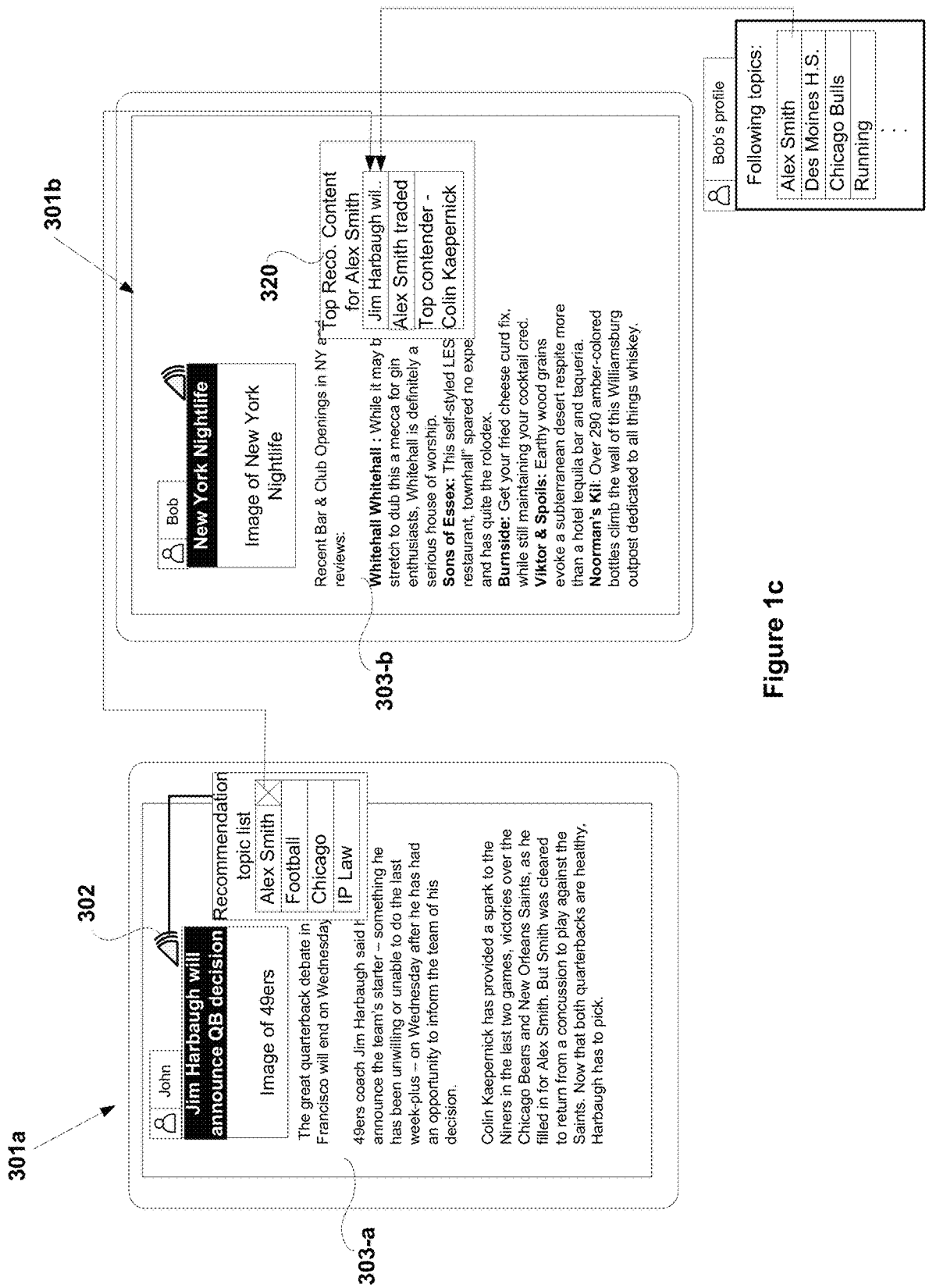
FIG. 1c illustrates a simplified rendition of media pages of a recommending user and a follower of a topic that is presented with the recommendation content, in one embodiment of the invention.

In response to selection of topic, the selected media content is provided to users that follow the selected topic. The recommend module 222 identifies the topic forum for the selected topic and makes the selected media content available to users of the identified topic forum. FIG. 1c illustrates the media page 301a of the recommending user and the media page 301b of an exemplary user that follows the topic forum for the topic associated with the selected media content. The media page of the recommending user, John, identifies the list of topics generated for the selected media content by the topic list generator module, in response to the recommending user's selection activity detected at the recommendation tool 302 on the media page. The list of topics includes topics identified from the keywords, such as "Alex Smith", "Football", extracted by the extraction engine based on the content 303-a of the selected media content and topics, such as "Chicago", "IP Law", identified based on the recommending user's following history. Further, the media page 301a identifies the topic, Alex Smith, selected by the recommending user from the topic list as the topic under which the selected media content is to be provided.

The media page 301b of user, Bob, who follows the topic, Alex Smith, includes the selected media content in the list of "Top Recommended data" 320. Bob's media page may be rendering content 303-b for a different topic forum, such as New York Nights topic forum. However, based on Bob's topic preferences will enable the selected media content to be provided in the recommended data user interface for Bob to interact. Bob's preference of topic forums may be obtained by analyzing Bob's profile obtained from the user data store. Based on the analysis, it is established that some of the topics that Bob follows include, "Alex Smith," "Des Moines High School," "Chicago Bulls," and "Running." As a result, Bob's media page 303-b includes recommendation data user interface 320 with content related to the topic "Alex Smith".

Figure 3A:
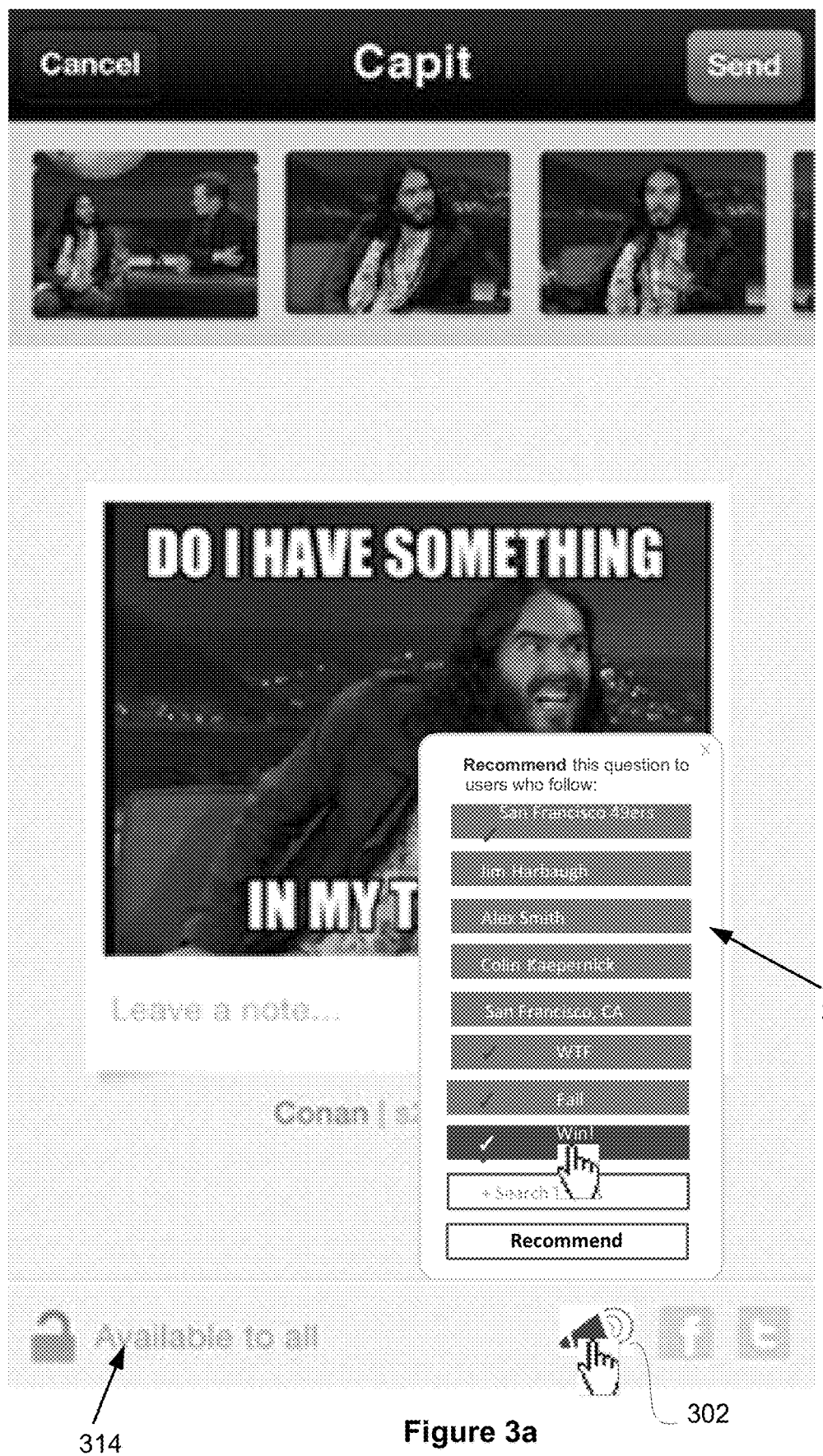
FIGS. 3a-3c illustrate exemplary screen renditions identifying recommend tool option available on mobile client devices and various media content that can be selected for sharing, in accordance with embodiments of the present invention.
Figure 3B:
Figure 3C:
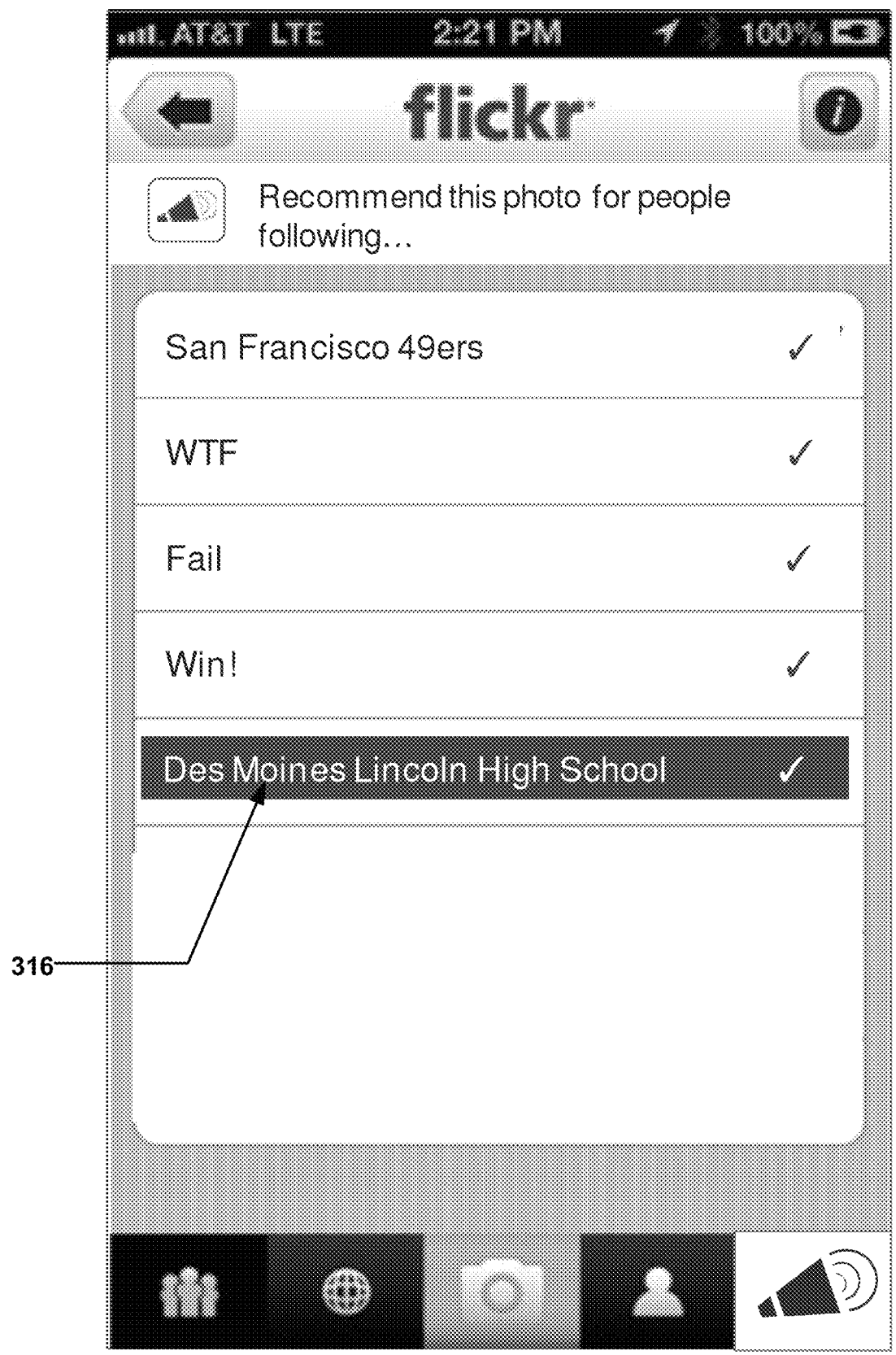

The recommendation data may include one or more of related content to one or more topics a user is following, metadata related to the content, user metrics of recommending user, content related sharing metrics, etc. In one embodiment, the recommendation data for the recommending user is different from the recommendation data for the users that follow the topic forum of the topic associated with the selected media content. In one embodiment, the recommendation data for the users following a particular topic may include a list of media content 320 for the topic forum, as illustrated in FIGS. 1c and 3e. The list of media content includes the selected media content that was recommended by the recommending user. The recommendation data for the recommending user, on the other hand, may include user's metrics that are computed by tracking other users interactions at the selected media content that the recommending user has recommended. FIG. 3f illustrates an exemplary user interface with the user metrics 322 of the recommending user computed by the recommendation engine.

In response to providing the selected media content in the topic forum followed by other users, the other users interaction at the selected media content are monitored and evaluated by the recommendation performance metrics module 224. The users interactions at the selected media content may provide insight into the users interest in the recommended media content as well as the relevance of the content to the users. The users interactions are evaluated to determine content and user related information, such as the number of users that recommend the selected media content to other users, number of users that viewed the selected media content, number of comments provided for the selected media content, etc. The content and user related information are used by recommendation performance metrics module 224 to derive user metrics, such as popularity of the recommending user, popularity of the topic forum, popularity of the selected media content, etc. The user and content metrics are provided to the user and content ranker module 228.

The user and content ranker module (or simply a ranker module) 228 uses the user and content metrics to rank the content and the recommending user. In one embodiment, the ranking of the recommending user may be used to determine the expertise level of the recommending user. For example, the recommending user may start off initially as a novice contributor and raise in expertise ranking to Curator, Expert and finally to an Editor, based on the number of other users interactions for the media content within the identified topic forum. In this embodiment, the contributor has the lowest ranking and the Editor has the highest ranking. It should be noted that the aforementioned expertise level ranking is exemplary and should not be considered restrictive. Other forms of ranking the recommending user may be used.

Figure 2D:
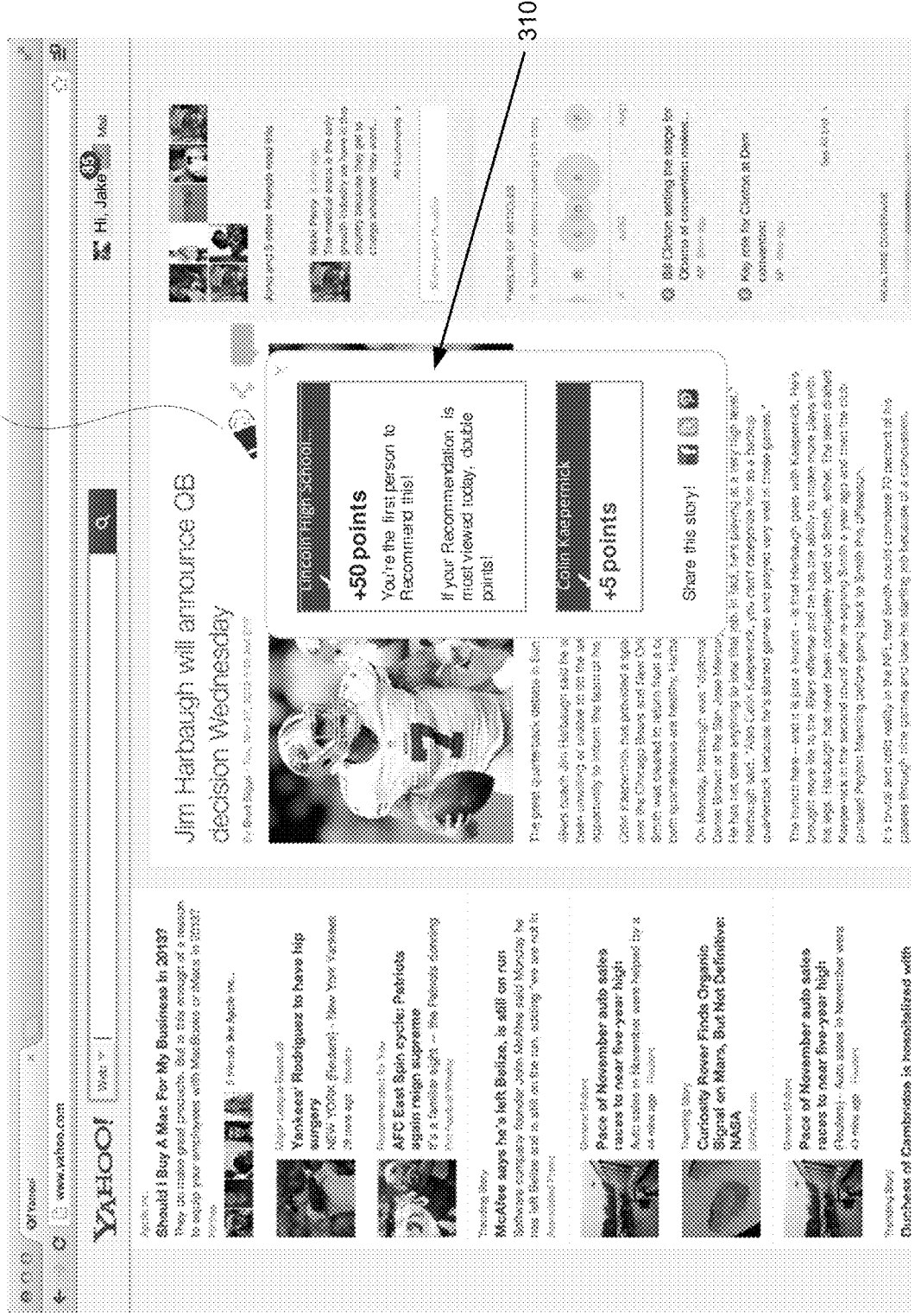

The ranker module 228 is also configured to provide monetary or non-monetary rewards to recommending users for recommending content that enhances other users' knowledge with a topic forum. In one embodiment, the ranker module 228 may award points based on the expertise level or reputation of the user. For example, the ranker module 222 may award pre-defined set of points to a recommending user for being the first one to recommend topic for the selected media content. FIG. 2d illustrates an exemplary award user interface 310 provided by the ranker module 228. The award user interface 310 identifies and renders the points awarded to the recommending user for recommending the new topic, Lincoln High School, for the selected media content. The ranker module 228 may include checks and balances to ensure that the recommending users are not awarded points for simply recommending content to multiple irrelevant topics to earn points. The ranker module 228 may interact with a rating threshold value module 229 to determine a pre-defined rating threshold value for popularity. The ranker module 228 determines the recommending user's popularity rating (i.e., reputation) and awards points once the recommending user has reached or met a popularity threshold rating. The recommending user's popularity rating metrics may be computed, in one embodiment, as a function of the number of users that view or share the selected media content recommended by the recommending user. As the recommending user accumulates more and more award points, the recommending user's reputation ranking increases. The expertise level of the recommending user may be rendered publicly. In one embodiment, the recommendation module 210 provides additional rights to a recommending user based on the number of points earned by the recommending user. Some of the rights include enabling the recommending user to publish content directly to other users and/or to moderate topic forums. The recommending user's popularity rating metrics are updated to the user data store 224 so as to be available for subsequent user data mining.

Figure 2E:
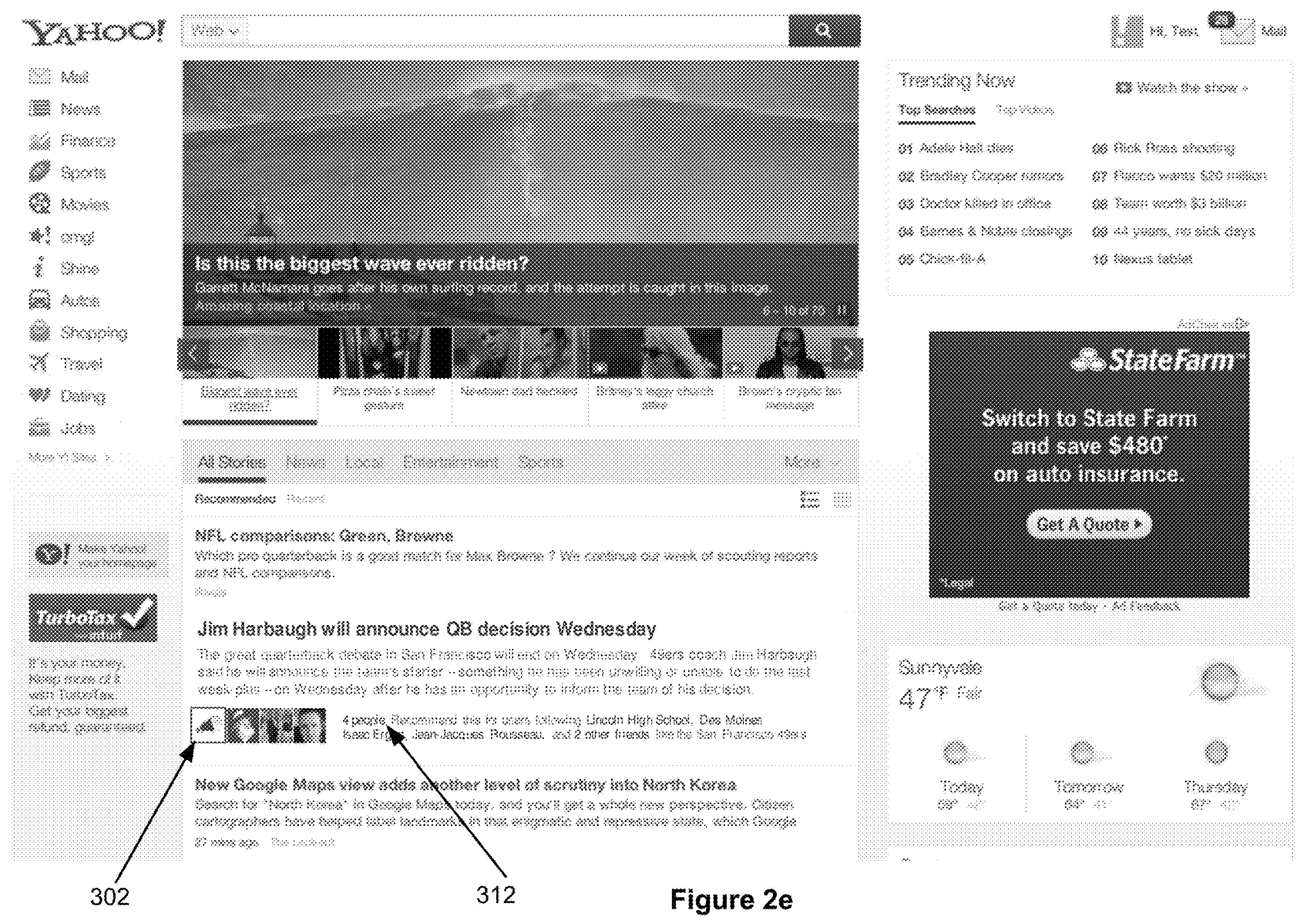

Continuing to refer to FIG. 1a, the recommendation engine will use the topic selected by the recommending user for a media content identified for sharing, to publish the media content to the appropriate forum. The media content will appear on the content page for the topic forum in an order based on the popularity rating of the recommending user. FIG. 2e illustrates an exemplary screen rendition of a content page for users that follow the Lincoln High School, Des Moines topic forum. As shown in FIG. 2e, the media content selected for sharing is published such that the users who follow the Des Moines Lincoln High School topic forum are able to see the shared media content. The published media content also includes user/content related metrics 312, such as the number of people and some of the names of the people that recommended this content for the topic forum, etc.

Figure 2F:
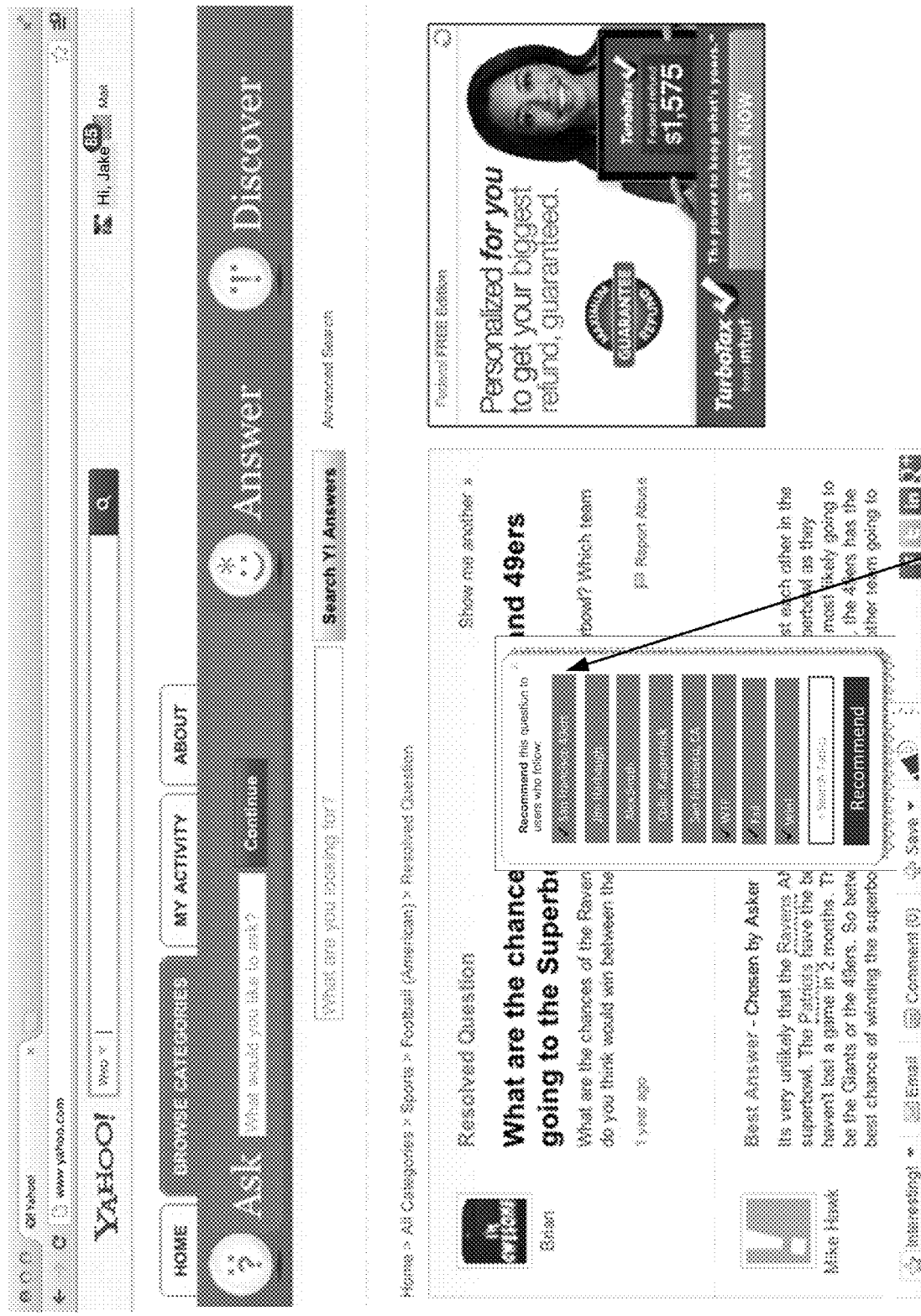

The recommending user is not constrained to recommending media content but may also recommend a query or answer to a query, as illustrated in FIG. 2f. The query or answer to the query may be selected for sharing by the recommending user. As part of the sharing, the recommending user may select a topic from a topic user interface 304 to associate the query or answer to the query so that the query or answer to the query is published to the appropriate topic forum for other users to access, view, comment or interact.

The recommendation engine may provide the recommendation tool 302 next to any media content provided on a content page, as illustrated in FIG. 2f. The website entity may provide the recommendation tool next to each media content or at the top of a content page in which a plurality of media content are rendered.

In embodiments illustrated in FIGS. 2a-2f, the client device 100 may be a personal computing device, a laptop computing device, a desktop device, a table computing device, etc. The embodiments are not restricted to the aforementioned devices but can be extended to mobile computing devices as well. FIG. 3a illustrates an exemplary screen rendition of a content page on a mobile computing device to enable a recommending user to share a selected media content using a simple, social two-click action, in one embodiment of the invention. In this embodiment, a recommend tool 302 is provided to enable a recommending user to select and share online media content with other users using the topic user interface 304. The media content may be a video content, a picture, an image, audio content, or any digital asset that can be rendered on the computing device.

A current status 314 of the media content may also be rendered alongside the media content being shared, at the display device of the mobile computing device.

The media content may be a picture captured in substantial real-time by the recommending user using the mobile computing device and shared directly with other users using a photo application tool. A topic for the captured picture may be selected using the recommend tool 302 provided at a user interface on the mobile computing device, as illustrated in FIG. 3b, so that the captured picture is made available to other users that follow the selected topic. When the recommending user selects a topic to share the photos/images/videos, etc., a photo application tag 316 is created by the topic selection detector 220 and associated with the selected media content, such as the photos/images/videos, etc., as illustrated in FIG. 3c. The embodiments provide the ability to publish content to a content page based around the interest captured within the media content. For example, a recommending user, who is a fan of Minnesota Vikings may take pictures/photos while attending the Vikings game and share those photos/pictures with other users following the topic using the recommend tool provided at the computing device's display interface.

Figure 3D:
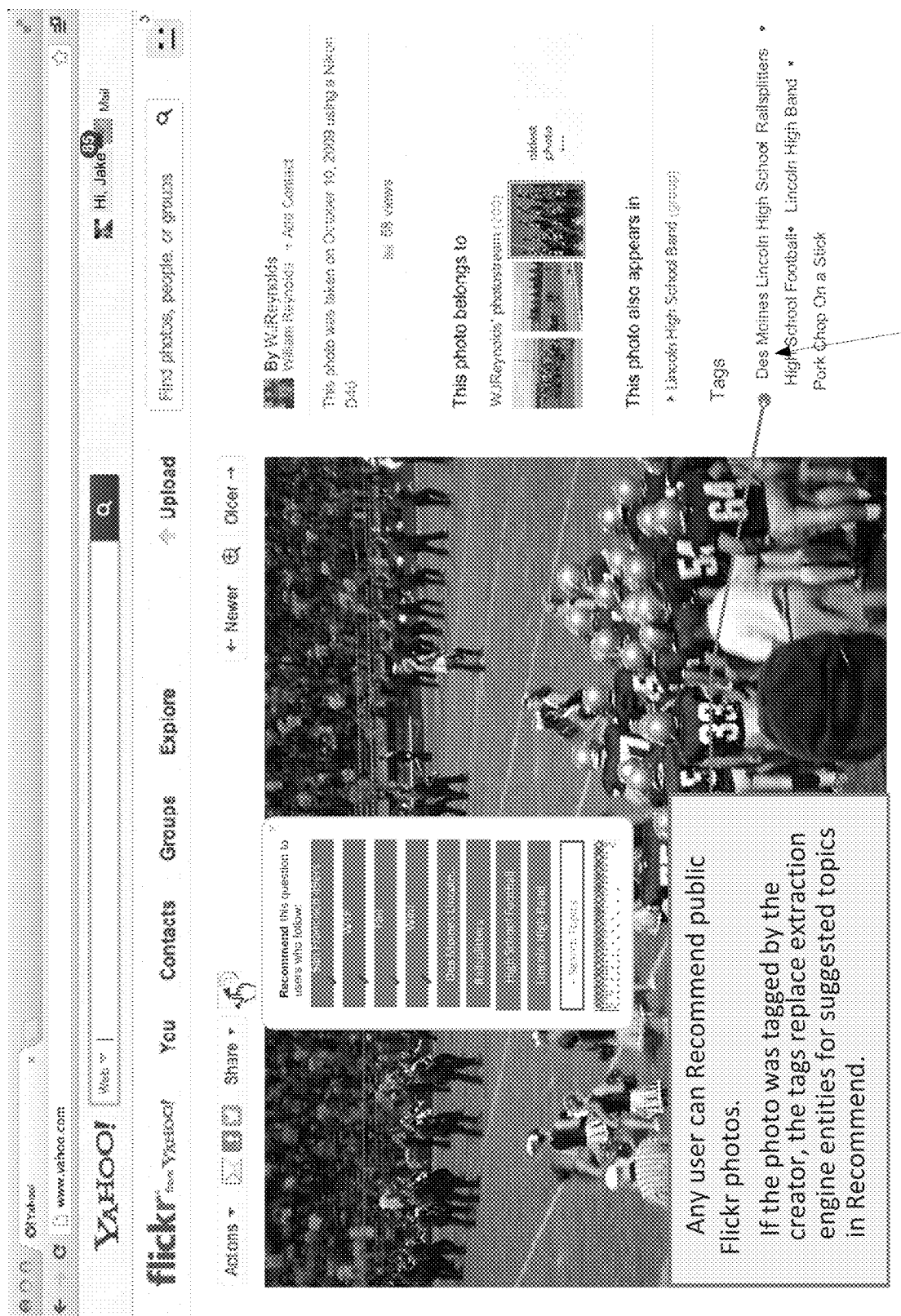
FIG. 3d illustrates an exemplary screen rendition of an image tagged with topic to associate with the image, selected by a user, in accordance with an embodiment of the present invention.
Figure 3E:
FIG. 3e illustrates an exemplary screen rendition of top recommended content for a topic that includes the image tagged by the user, in accordance an embodiment of the invention.
Figure 3F:
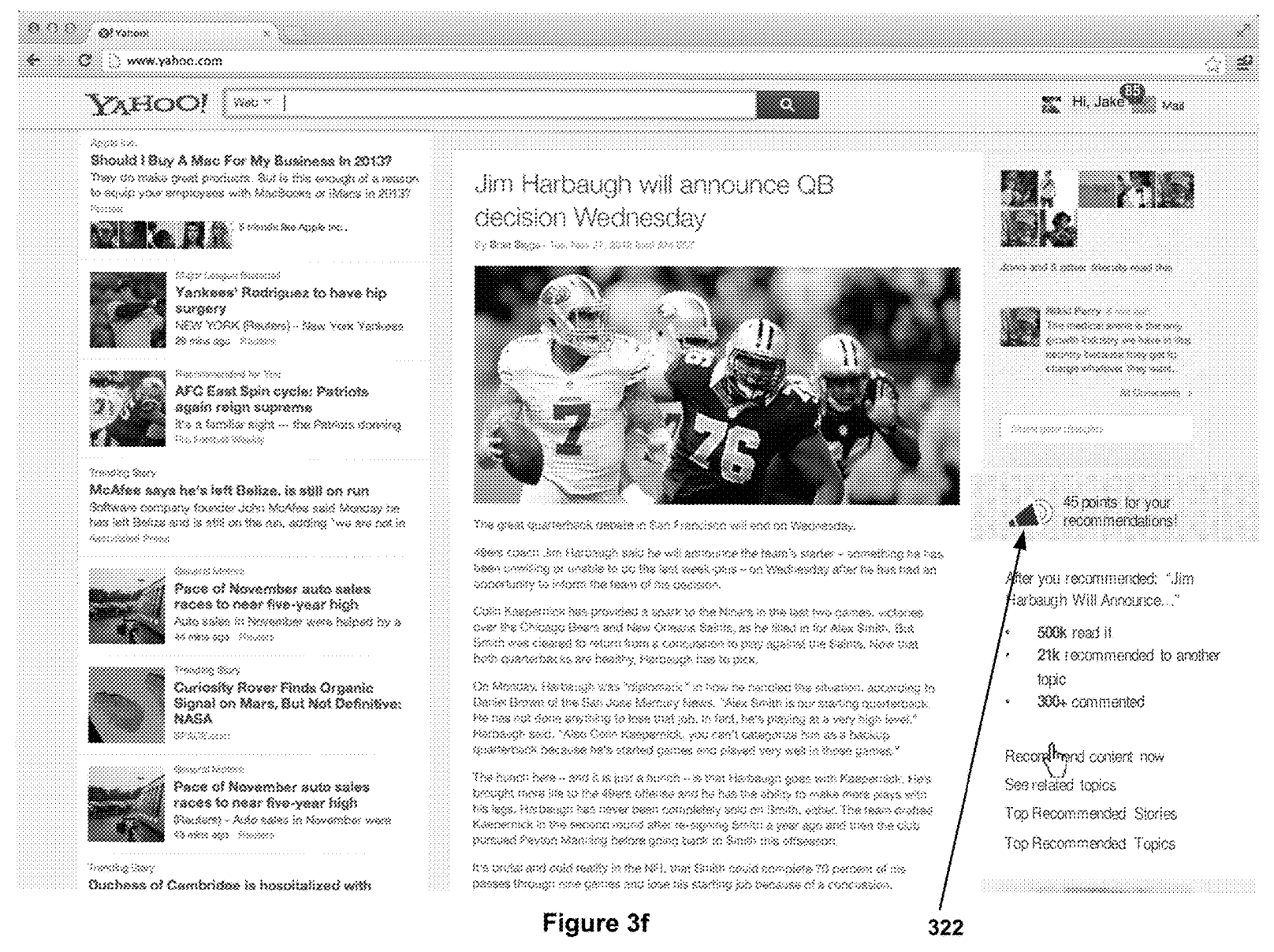

FIG. 3d illustrates the list of tags 318 that are associated with the photo/image/picture captured by the mobile computing device. It should be noted that the recommending user can not only select, tag and share photos/images/pictures that the recommending user captures using his computing device but can select and share photos/images/pictures that are publicly available. The tags related to the topic selected by the recommending user, in one embodiment, overrides or replaces the tag that was associated with the selected media content by a context extraction engine. As the recommending user's popularity rating increases, the media content recommended by the recommending user will be fast-tracked for publishing in the content stream of users that follow the topic forum associated with the media content.

FIG. 3e illustrates a media page with a user interface 320 provided by the recommendation module for presenting the selected media content. The user interface 320 includes the selected media content as well as other media content associated with the topic that the users are following. The media content in the user interface 320 is organized in the order of relevancy as dictated by the recommending user's metrics and content metrics.

Referring to FIGS. 1a and 3e, the recommendation engine takes into account the interactions of other users at the media content and organizes the media content for the topic forum based on the popularity rating of the recommending user. In one embodiment, after the recommending user shares the media content, when other users recommend the content to additional users for the same topic forum, the popularity rating of the recommending user increases. Based on the revised popularity rating of the recommending user, organization of the media content within the user interface 320 may be further refined to correctly reflect the ranking of the media content as it relates to the popularity rating of the recommending users. Thus, the recommendation engine emphasizes the role of the users recommendations over that of an algorithm when categorizing the media content so that the content is published in the content streams of the corresponding topic forum.

FIG. 3f illustrates an example of a media page with a user interface presenting the user metrics of the recommending user as it relates to the media content. The recommendation engine may, in one embodiment, extract and present user related metrics associated with the recommending user in a metric user interface 322 along with some content related metrics. As shown in FIG. 3f, the metric user interface 322 renders the total points awarded to the recommending user for having recommended the media content to users following a particular topic forum (for e.g., Lincoln High topic forum) and provides statistics on the amount of interactions that occurred at the shared media content in response to the recommendation provided by the recommending user. Additionally, the metric user interface 322 also includes additional links/tools for recommending the content, viewing related topics for the selected media content, top recommended stories or topics that are currently trending.

Figure 4:
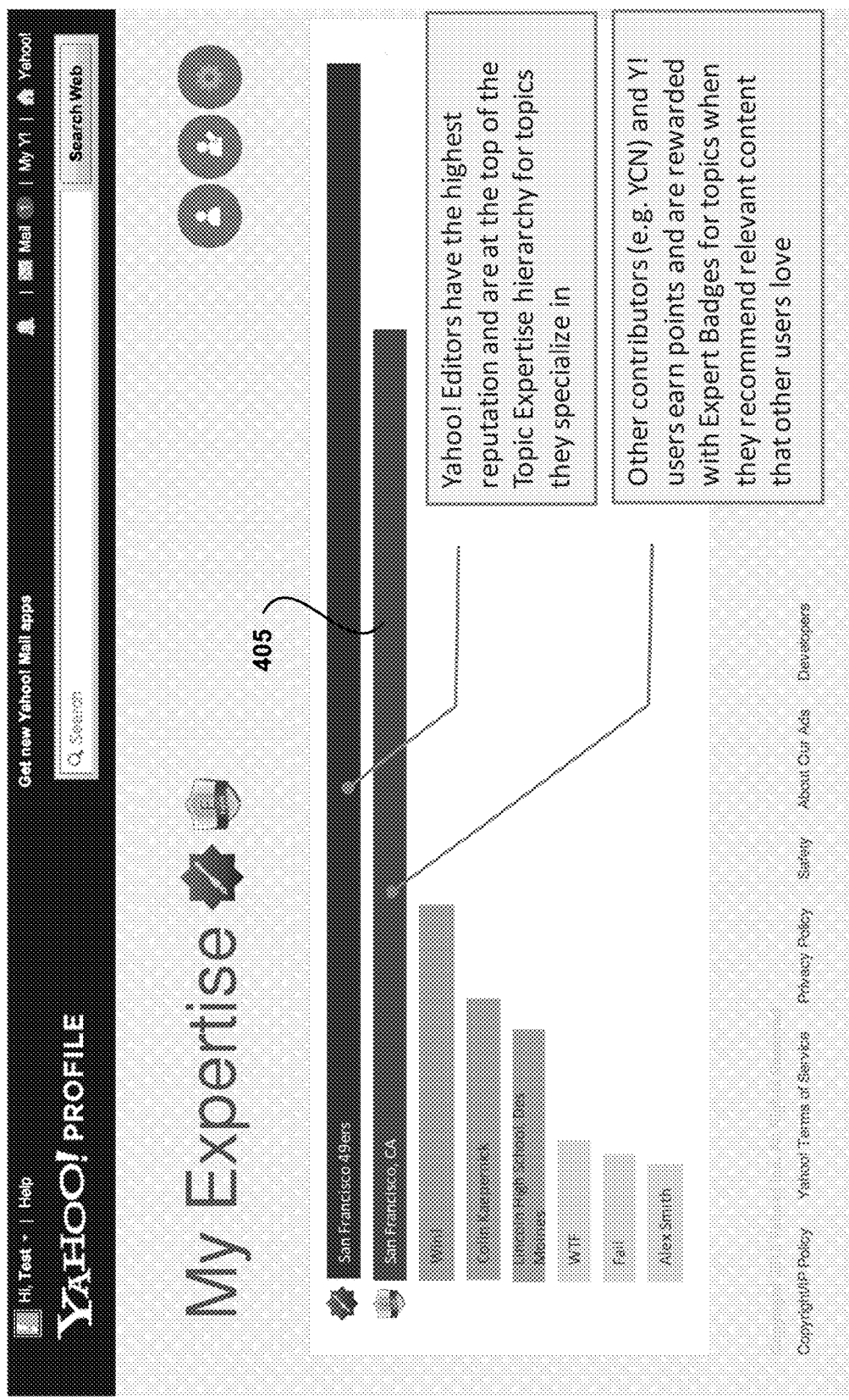
FIG. 4 illustrates an exemplary screen rendition identifying the reputation of the users based on the topics suggested by the users for a media content, in accordance with one embodiment of the invention.

Based on the user metrics resulting from the sharing of the media content, the recommending user's expertise level may be determined by the recommendation engine. FIG. 4 illustrates an exemplary view of the recommending user's popularity ranking compared to other contributors/recommending users of the content page. As shown, the recommending user has earned an "expert" ranking based on other users' interactions at the recommended media content. As more and more users within the topic forum interact with the media content, the recommending user's popularity rating improves and the recommending user's expertise level changes to reflect the recommending user's improved popularity rating.

The various embodiments describe a recommendation tool that enables a user to select a media content and associate a topic to the selected media content based on how the media content relates to the user. For example, the user may recommend topics that are colloquial, current trends (for e.g., Fail), or combined topics (for e.g., "new moms"), etc. Since users understand how content relates to their interests, the users can recommend media content to topics that the context extraction engine would never unearth. The related topics are used to publish the content to other users in the corresponding topic forum. Rewarding points and/or providing rights to the user encourages the user to provide more recommendations, thereby engaging the user. The recommendations allow the other users to enhance their knowledge and information sharing within the respective topic forums, enriching the other users content sharing experience.

Figure 5:
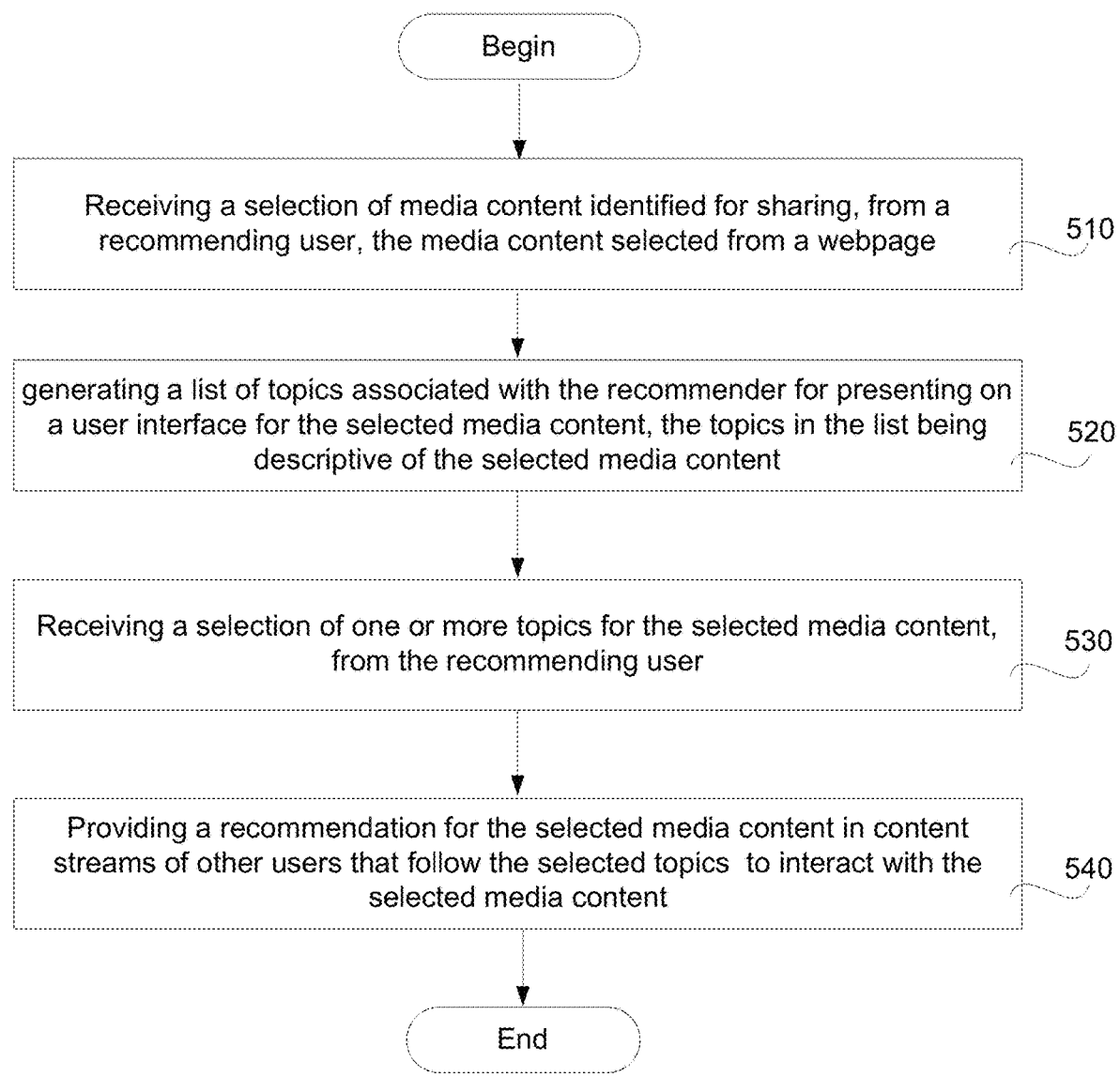
FIG. 5 illustrates exemplary method operations followed for recommending a media content, in accordance with an embodiment of the invention.

In FIG. 5, is an illustration of a method for recommending online media content rendered on a content page, according to one embodiment of the present invention. The method begins at operation 510 wherein a selection of media content rendered on a content page, is received from a recommending user. The media content may be selected using a recommendation tool that may be provided alongside the media content. The selection may be an active or a passive selection interaction at the recommendation tool.

In response to receiving the selection of the media content, a list of topics associated with the recommending user is generated for presenting on a user interface for selection, as illustrated in operation 520. The topics within the list may be obtained from a context extraction engine that may engage a keyword extraction algorithm to identify keywords from within the content. The keywords are used to define the one or more topics for associating with the media content. The topics within the list may also include topics that the recommending user explicitly or implicitly follows, informal topics, tags, memes, or sentiments either presented to the recommending user or specified by the recommending user, questions, photo sharing application tags, places and locations, nearby users, etc. The generated list of topics is returned to a client device for rendering and user selection.

Selection of a topic for the selected media content from the list is received by a recommendation engine, as illustrated in operation 530. The selection of the topic provides a recommending user's relevancy perspective of the selected media content. The recommending user's selection of the topic may identify topics that might not normally be identified by an algorithm. The method concludes with the selected media content being provided as a recommendation, in content streams to other users that follow the selected topic, as illustrated in operation 540.

Figure 6:
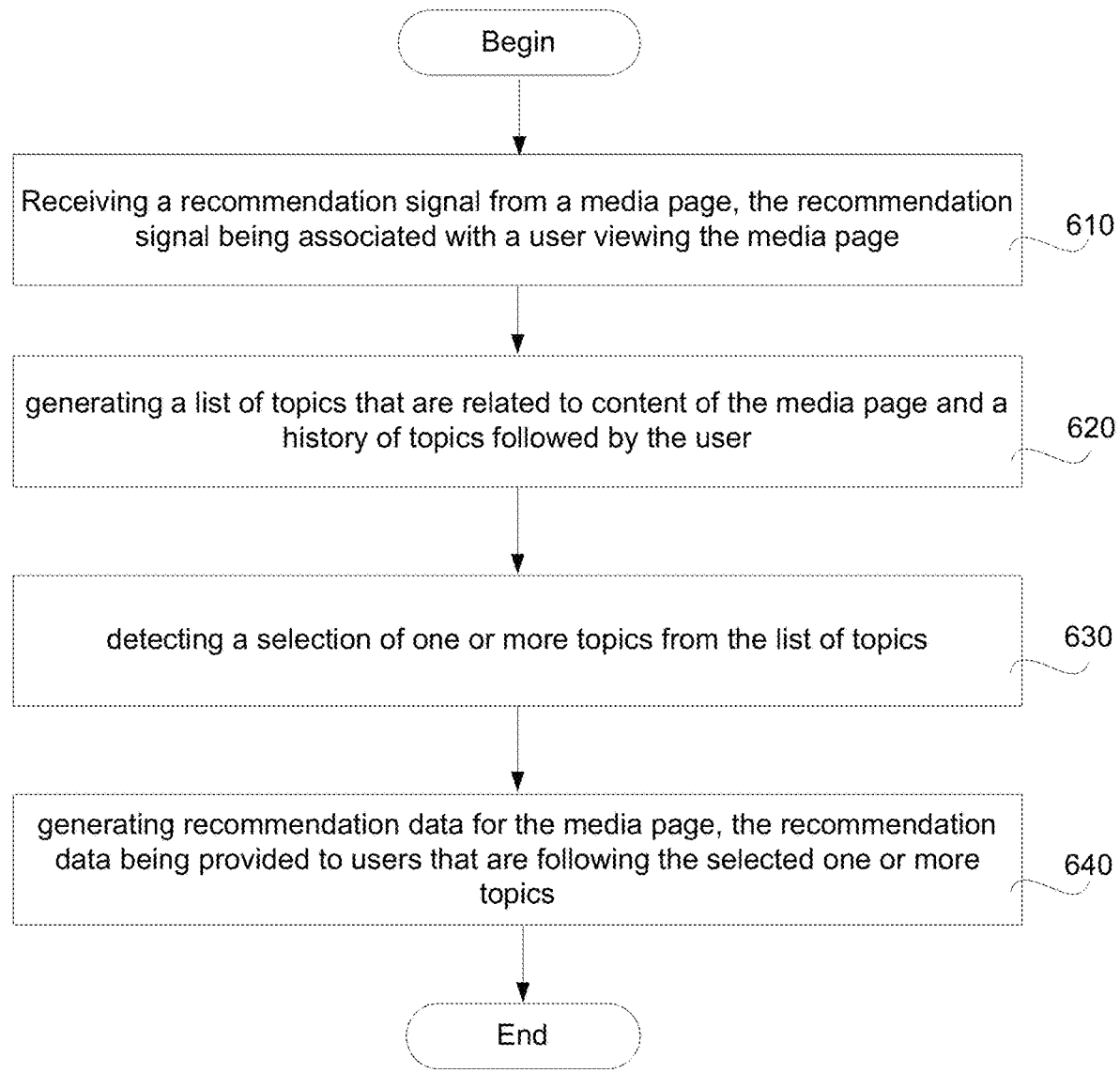
FIG. 6 illustrates exemplary method operations followed for recommending a media content, in accordance with an alternate embodiment of the invention.

FIG. 6 illustrates method operations for recommending online media content rendered on a content page, in according to one embodiment of the present invention. The method begins at operation 610, when a recommendation signal is received from a media page. The recommendation signal is generated when a recommending user selects a recommendation tool provided for the media content in the media page. The selection of the recommendation tool is associated with the recommending user that is viewing the media page.

In response to receiving the recommendation signal, a list of topics is generated, as illustrated in operation 620. The topics in the list are related to the content of the media page and to a history of topics followed by the user. The topics related to the content may be obtained using an extraction engine that identifies keywords in the media content and a recommendation module may identify one or more topics related to the keywords. The recommendation engine may also analyze user interactions at the media page over time to determine history of topics that the user has followed over time. The list of topics is generated using the information from the analysis and the extraction engine. The list of topics is returned for rendering on the media page.

Selection of one or more topics from the list of topics rendered on the media page, is detected, as illustrated in operation 630. The selection of one or more topics identifies the users perception of relevance of the content selected for sharing. The selected topics are associated with the content of the media page by tagging the topics to the content of the media page.

In response to the selection of one or more topics, recommendation data is generated for the media page, as illustrated in operation 640. The generated recommendation data are provided to users that follow the selected topics. The recommendation data provided for other users may include the content that was recommended from the media page along with other contents for the topics followed by the user. In addition to providing the recommendation data to other users, the recommendation data may also be provided to the recommending user. The recommendation data provided for the recommending user may include user and content related metrics that are computed based on the other users interactions for the recommended content of the media page. The user metrics is used to determine the popularity and reputation of the recommending user, which may affect the relative ranking of the content within the content stream.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network. A sample computer system is depicted in FIGS. 7A-7C.

Figure 7A:
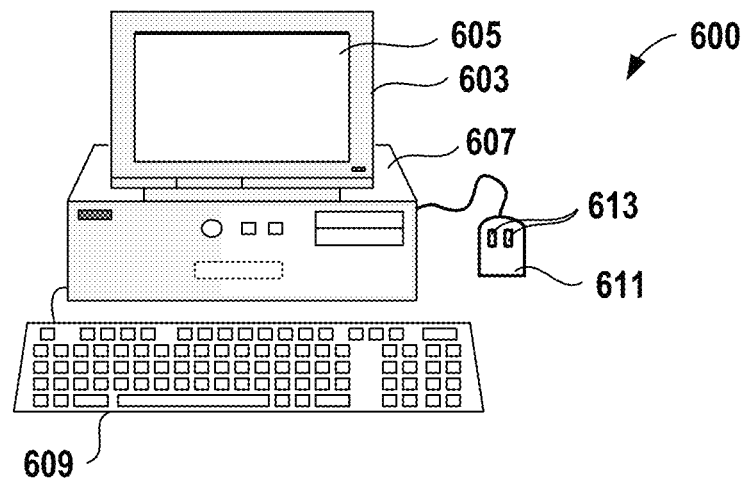
FIG. 7A is a generalized diagram of a typical computer system suitable for use with the present invention.

In FIG. 7A, is an illustration of an embodiment of an exemplary computer system 600 suitable for use with the present invention including display 603 having display screen 605. Cabinet 607 houses standard computer components (not shown) such as a disk drive, CDROM drive, display adapter, network card, random access memory (RAM), central processing unit (CPU), and other components, subsystems and devices. User input devices such as a mouse 611 having buttons 613, and keyboard 609 are shown. Other user input devices such as a trackball, touchscreen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 7B:
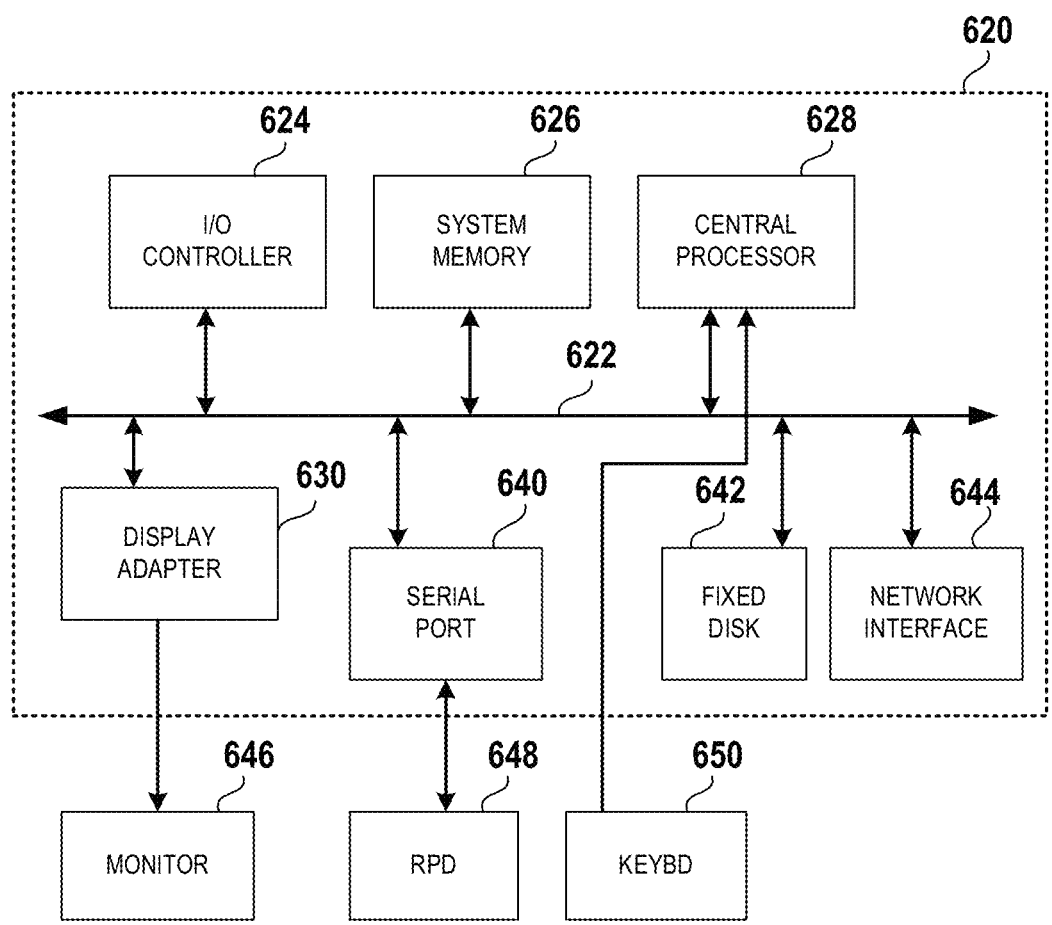
FIG. 7B shows subsystems in the typical computer system of FIG. 7A.
Figure 7C:
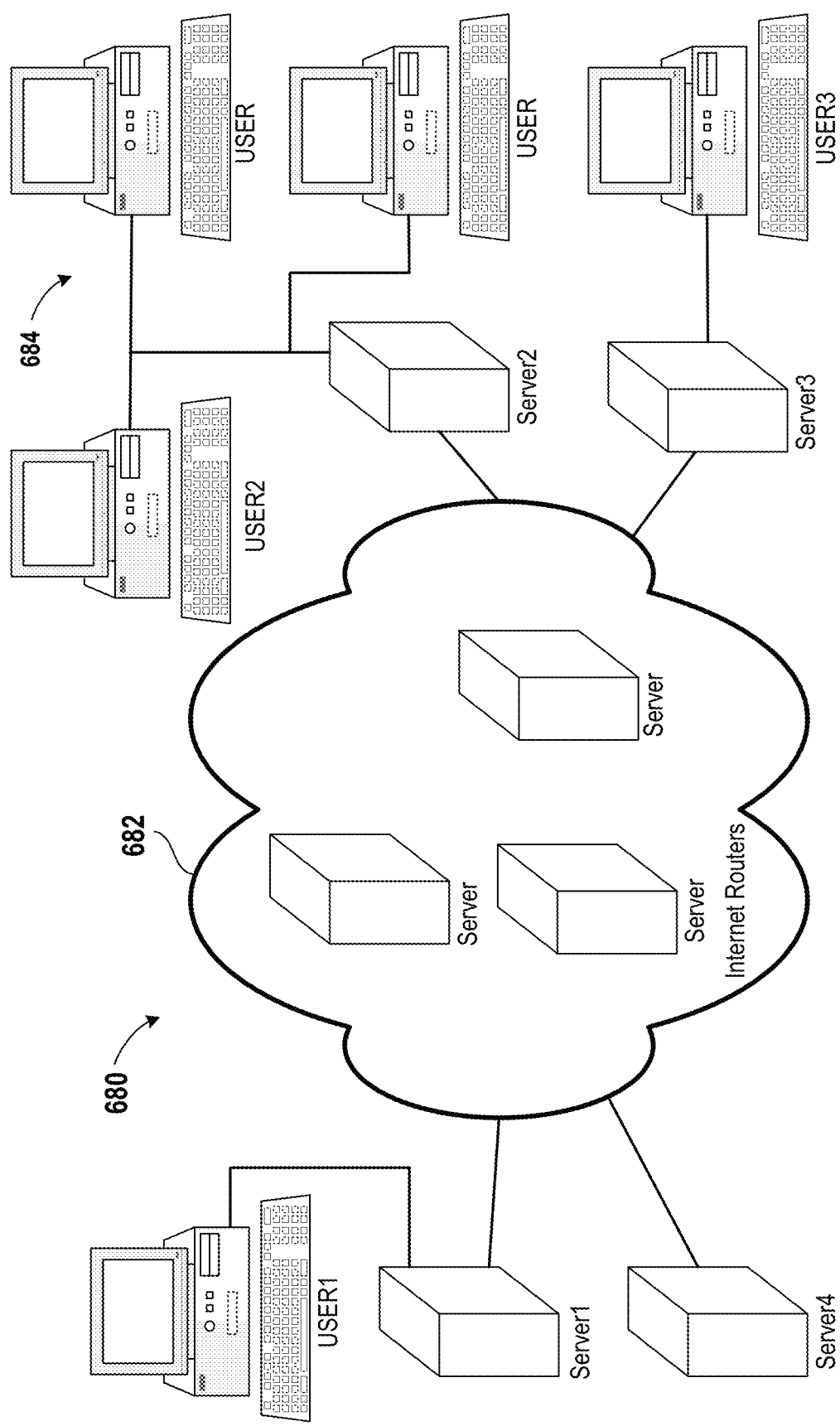
FIG. 7C is a generalized diagram of a typical network suitable for use with the present invention.

FIG. 7B illustrates an exemplary subsystems that might typically be found in a computer such as computer 600. In FIG. 7B, subsystems within box 620 are directly interfaced to internal bus 622. Such subsystems typically are contained within the computer system such as within cabinet 607 of FIG. 6A. Subsystems include input/output (I/O) controller 624, System Random Access Memory (RAM) 626, Central Processing Unit (CPU) 628, Display Adapter 630, Serial Port 640, Fixed Disk 642 and Network Interface Adapter 644. The use of bus 622 allows each of the subsystems to transfer data among the subsystems and, most importantly, with the CPU. External devices can communicate with the CPU or other subsystems via the bus 622 by interfacing with a subsystem on the bus. Monitor 646 connects to the bus through Display Adapter 630. A relative pointing device (RPD) 648 such as a mouse connects through Serial Port 640. Some devices such as a Keyboard 650 can communicate with the CPU by direct means without using the main data bus as, for example, via an interrupt controller and associated registers (not shown).

As with the external physical configuration shown in FIG. 7A, many subsystem configurations are possible. FIG. 7B is illustrative of but one suitable configuration. Subsystems, components or devices other than those shown in FIG. 7B can be added. A suitable computer system can be achieved without using all of the subsystems shown in FIG. 7B. For example, a standalone computer need not be coupled to a network so Network Interface 644 would not be required. Other subsystems such as a CDROM drive, graphics accelerator, etc. can be included in the configuration without affecting the performance of the system of the present invention.

FIG. 7C is a generalized diagram of a typical network. In FIG. 7C, the network system 680 includes several local networks coupled to the Internet. Although specific network protocols, physical layers, topologies, and other network properties are presented herein, embodiments of the present invention are suitable for use with any network.

In FIG. 7C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of server routers 682. Note that the use of the Internet for distribution or communication of information is not strictly necessary to practice the present invention but is merely used to illustrate embodiments, above. Further, the use of server computers and the designation of server and client machines are not critical to an implementation of the present invention.

USER1 Computer can be connected directly to the Internet. Server1's connection to the Internet is typically by a relatively high bandwidth transmission medium such as a T1 or T3 line.

Similarly, other computers at 684 are shown utilizing a local network at a different location from USER1 computer. The computers at 684 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine. Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or personal information manager (also referred to as a "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" or "computer-readable media" for purposes of embodiments of the present invention may be any medium/media that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, carrier wave, or computer memory. The computer readable medium may have suitable instructions for synchronously presenting multiple video program ID streams, such as on a display screen, or for providing for input or presenting in accordance with various embodiments of the present invention.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
receiving a recommendation signal from a media page rendering content at a client device, the recommendation signal being triggered by user action at a recommendation signal tool included in the media page, and is associated with a user viewing the media page;
generating a list of topics for rendering at the client device, the list includes topics that are related to content of the media page and topics that a user followed historically;
providing a selectable option for the user to define a new topic for associating with the content of the media page;
detecting selection of a topic to associate with the content of the media page, wherein the topic selected is the new topic or one of the topics from the historical following of the user and is different from the topics that are related to the content of the media page, wherein the selected topic is associated with a corresponding topic forum;
associating the selected topic to the content of the media page, wherein the association allows the content of the media page to be published under the corresponding topic forum associated with the selected topic, such that other users following the selected topic can access and view the content of the media page in the corresponding topic forum; and
generating recommendation data for presenting to the other users following the selected topic, the recommendation data includes a list of media pages associated with the selected topic including the media page from where the recommendation signal was triggered,
wherein after providing the recommendation data, evaluating interactions from the other users at the media page in the corresponding topic forum for the selected topic, to derive user related metrics of the user defining the selected topic, the user related metrics of the user used in dynamically ranking the media page in the list of media pages included in the recommendation data,
wherein method operations are performed by a processor of a server computing device that publishes the content.

2. The method of claim 1, further includes generating a tag for the selected topic and associating the tag to the content of the media page, the tag used during distribution of the content of the media page to other users following the selected topic.

3. The method of claim 1, wherein the recommendation data provided to other users includes the media pages for the topic organized in a ranking order defined by popularity scores associated with the media pages.

4. The method of claim 3, wherein the ranking order is defined by relative ranking of other users sharing the content of the media pages for the selected topic.

5. The method of claim 1, wherein the recommendation data provided to the user initiating the recommendation signal includes the user related metrics of the user sharing the content of the media page.

6. The method of claim 1, wherein providing an option to define a new topic further includes providing a search option to search for a topic that is different than the topics identified in the list, the topic identified from the search being associated with the content of the media page as the new topic.

7. A method for recommending online media content, comprising:
- receiving a selection of media content identified for sharing from a content page rendered at a client device, the media content selection related to user action at the content page, and is associated with a user interacting with the content page;
- generating a list of topics for the selected media content for presenting on a user interface at the client device, the list of topics include topics associated with the media content and topics associated with the user, the topics being descriptive of the media content selected for sharing;
- providing a selectable option to define a new topic for associating with the media content selected for sharing on the content page;
- receiving selection of a topic for the selected media content from the user, the received selection defining a relevancy perspective of the user for the selected media content, wherein the topic selected is the new topic or the topic associated with the user and is different from the topics that are related to the selected media content of the content page, the selected topic associated with a corresponding topic forum;
- associating the selected topic to the media content of the content page, wherein the associating includes,
  - generating a tag for the selected topic;
  - associating the tag to the media content of the content page, the tag used during distribution of the media content of the content page to other users following the selected topic; and
- providing a recommendation of the selected media content in content streams of the other users that follow the selected topic, so as to enable the other users to interact with the selected media content,
- wherein method operations are performed by a processor of a server computing device that provides access to the media content.

8. The method of claim 7, wherein the selection is done using a recommendation tool provided alongside the media content on the content page, the recommendation tool generating a recommendation signal.

9. The method of claim 7, wherein the topics associated with the user are identified based on history of topics followed by the user.

10. The method of claim 9, wherein the history of topics followed by the user identified based on explicit or implicit interactions at different media content rendered on the content page, gathered over time.

11. The method of claim 7, wherein providing the option further includes,
- providing a search option in the user interface for the user to search for a topic that is different than the topics identified in the list, for associating with the selected media content.

12. The method of claim 7, wherein distributing the selected media content includes providing a link to the selected media content in the content streams of the other users.

13. The method of claim 7, wherein the media content is one or more of article, quote, comment, picture, image, or any digital asset that can be posted on a website.

14. The method of claim 7, further includes,
- monitoring interactions of the other users for the selected media content recommended for sharing;
- computing user metrics of the user recommending the selected media content based on the interactions of the other users detected at the selected media content, the user metrics defining reputation and popularity of the user recommending the selected media content;
- comparing the user metrics against a pre-defined threshold value; and
- updating an expertise level of the user recommending the media content based on the comparison, wherein the expertise level is used to obtain additional tools related to recommending content to the other users.

15. The method of claim 14, further includes providing monetary or non-monetary awards to the user based on the expertise level of the user.

16. The method of claim 7, further includes providing monetary or non-monetary awards to the user recommending the selected media content.

17. A non-transitory computer readable medium having program instructions for recommending an online media content, comprising:
- program instructions for receiving a selection of media content identified for sharing from a content page, the media content selection associated with a user viewing the content page;
- program instructions for generating a list of topics for the selected media content for presenting on a user interface, the list of topics includes topics associated with the media content and topics associated with the user, the topics being descriptive of the media content selected for sharing;
- program instructions for providing a selectable option to define a new topic for associating with the media content selected for sharing on the content page;
- program instructions for receiving selection of a topic for the selected media content from the user, the received selection defining a relevancy perspective of the user for the selected media content, wherein the topic selected is the new topic or the topic associated with the user and is different from the topics that are related to the selected media content of the content page, the selected topic associated with a corresponding topic forum;
- program instructions for associating the selected topic to the media content of the content page, wherein the program instructions for associating includes,
  - program instructions for generating a tag for the selected topic and associating the tag to the media content of the content page, the tag used during distribution of the media content of the content page to other users following the selected topic; and
- program instructions for providing a recommendation of the selected media content in content streams of the other users that follow the selected topic, so as to enable the other users to interact with the selected media content, wherein program instructions for providing the recommendation further includes program instructions for tracking interactions from the other users at the selected media content, the tracked interactions used in refining a ranking of the selected media content provided in the content streams of the other users that follow the selected topic.

18. The non-transitory computer readable medium of claim 17, wherein program instructions for providing the option further includes,
- program instructions for providing a search option in the user interface for the user to search for a topic that is different than the topics identified in the list, for associating with the selected media content.

19. The non-transitory computer readable medium of claim 17, wherein program instructions for presenting the list of topics further includes program instructions to identify topics based on history of topics followed by the user that is initiating the sharing, wherein the history of topics identified by monitoring explicit or implicit interactions of the user initiating the sharing at different media content rendered over time.

\* \* \* \* \*